July 11, 1933.   S. BRAND   1,917,356
CASH REGISTER
Filed Sept. 9, 1929   11 Sheets-Sheet 4

Inventor
Samuel Brand
By Earl Beust
Ralph S. Warfield
His Attorneys

July 11, 1933.  S. BRAND  1,917,356
CASH REGISTER
Filed Sept. 9, 1929    11 Sheets-Sheet 5
FIG. 6
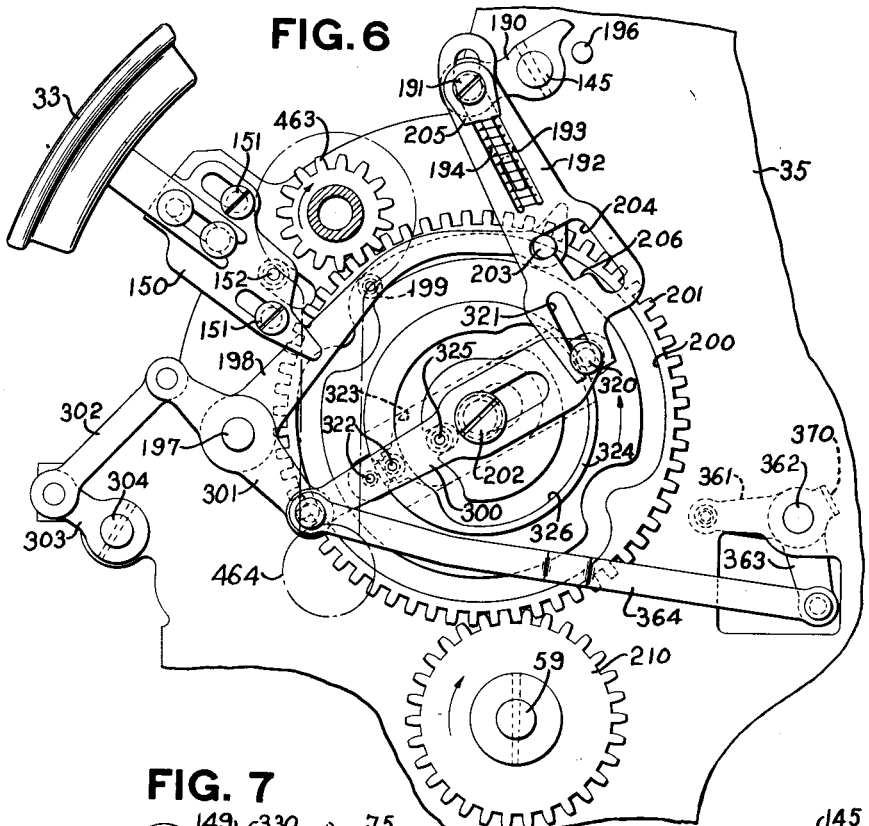
FIG. 7
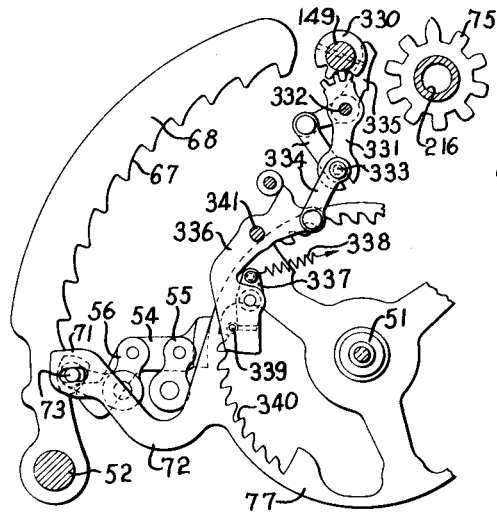
FIG. 8
FIG. 9
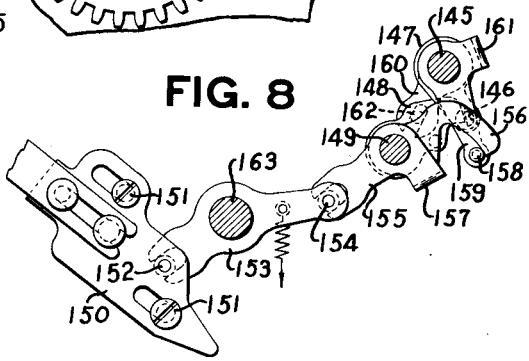
Inventor
Samuel Brand
By Earl Beust
Ralph S. Warfield
His Attorneys

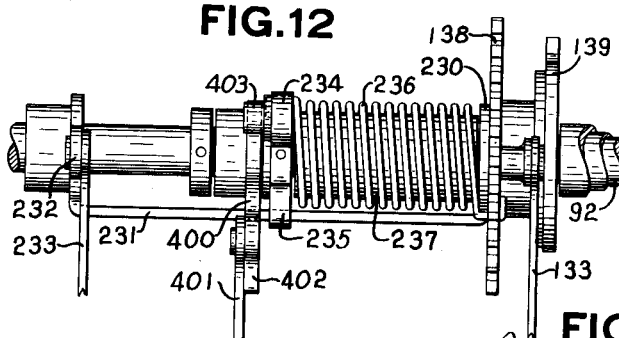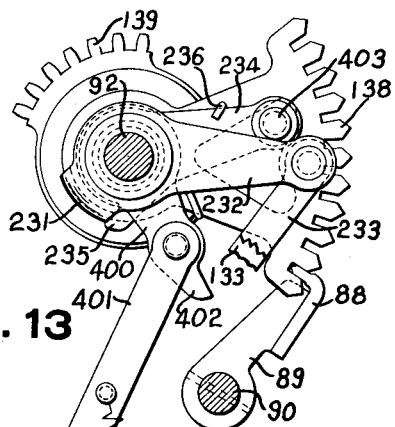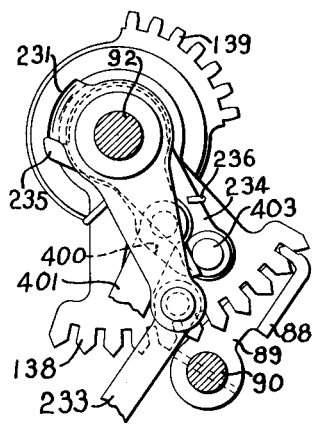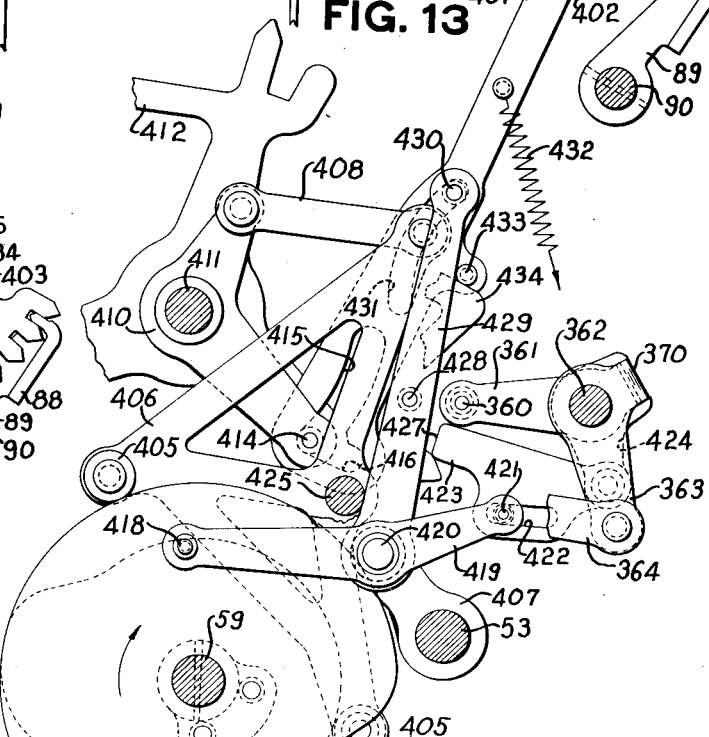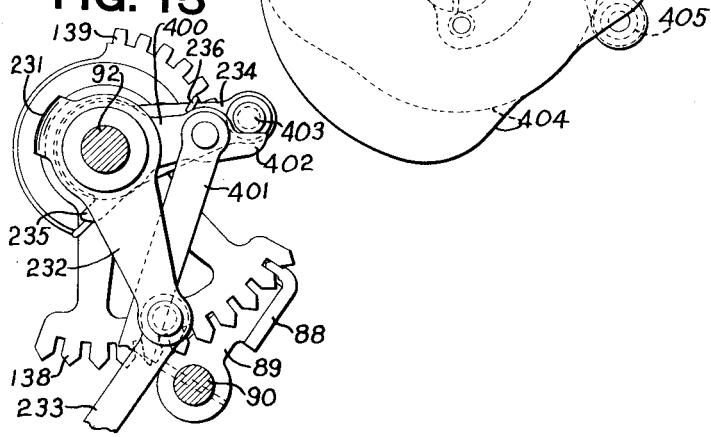

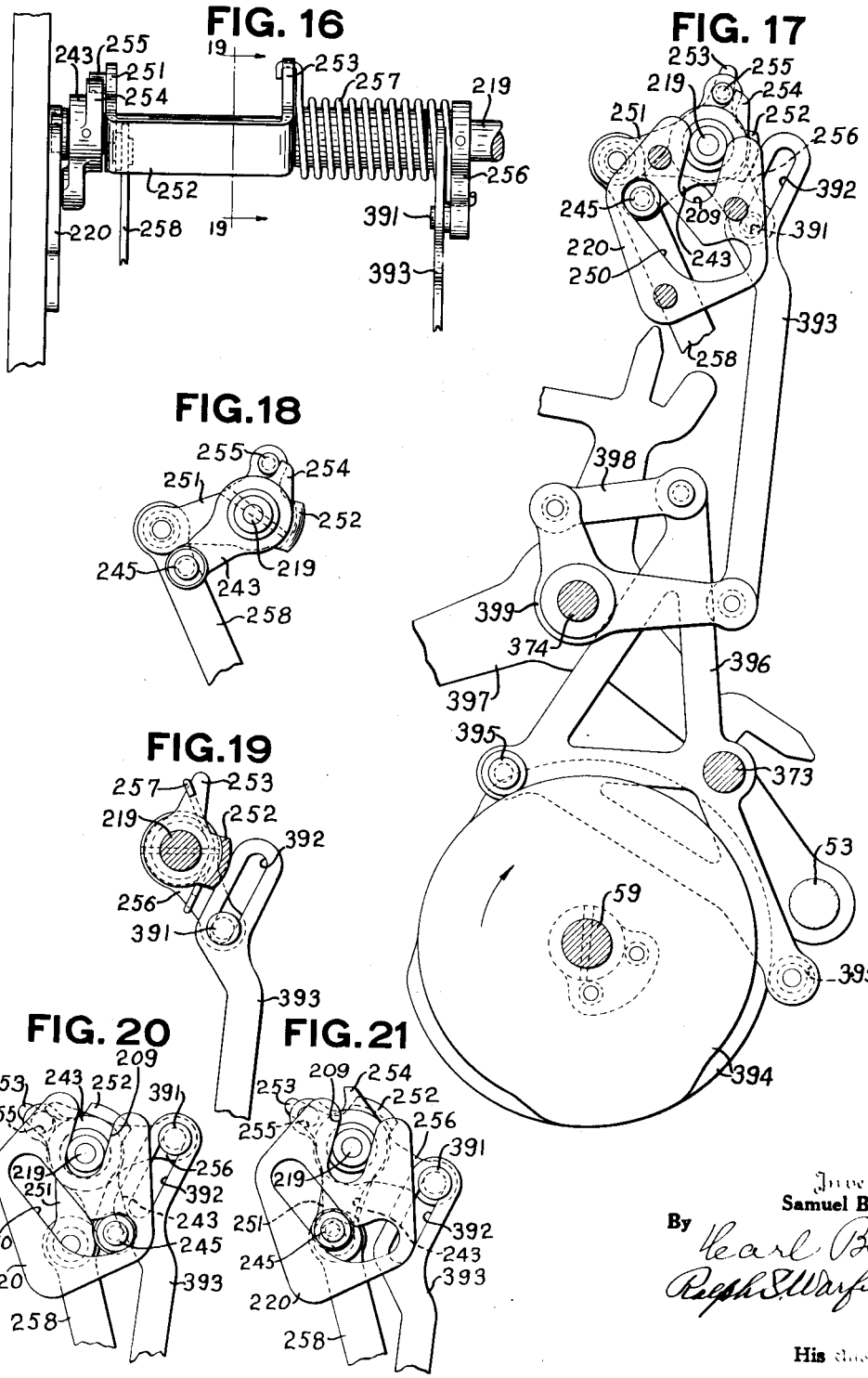

July 11, 1933.  S. BRAND  1,917,356
CASH REGISTER
Filed Sept. 9, 1929  11 Sheets-Sheet 11

Inventor
Samuel Brand
By Earl Beust
Ralph S. Warfield
His Attorneys

Patented July 11, 1933

1,917,356

UNITED STATES PATENT OFFICE

SAMUEL BRAND, OF DAYTON, OHIO, ASSIGNOR TO THE NATIONAL CASH REGISTER COMPANY, OF DAYTON, OHIO, A CORPORATION OF MARYLAND

CASH REGISTER

Application filed September 9, 1929. Serial No. 391,276.

This invention relates to registering and like machines, and is more particularly directed to totalizer engaging and controlling mechanisms for such machines.

The type of machines to which the present invention is shown applied is fully illustrated and described in Letters Patent of the United States, Nos. 1,242,170 and 1,394,256, issued on October 9, 1917, and October 18, 1921, respectively, to F. L. Fuller and No. 1,619,796 issued on March 1, 1927, to B. M. Shipley.

One object of this invention is to provide mechanism by means of which amounts may be automatically transferred from any of a plurality of totalizers located all on one line, to another totalizer, known herein as the grand totalizer, located on the same line.

With this and incidental objects in view, the invention consists of certain novel features of construction and combinations of parts, the essential elements of which are set forth in appended claims and a preferred form or embodiment of which is hereinafter described with reference to the drawings which accompany and form a part of this specification.

In the drawings:

Fig. 6 is a detail view of a part of the operating mechanism located on the right side frame of the machine.

Fig. 7 is a fragmentary detail view showing the mechanism for disconnecting the differential latch on total taking operations.

Fig. 8 is a detail view of a train of mechanism for releasing the machine for operation upon depression of the motor release bar.

Fig. 9 is a detail view of a part of the releasing mechanism shown in Fig. 8.

Fig. 12 is a fragmentary view of a tensioning means forming a part of the grand totalizer selecting mechanism shown in Fig. 13.

Fig. 13 is a detail view of the mechanism for shifting the totalizer lines to select the grand totalizer on transfer total operations.

Fig. 14 is a detail view of a part of the mechanism shown in Fig. 13, with the aliner segment moved to the "cash" position by the transaction key-controlled differential.

Fig. 15 is a similar view showing the aliner segment in the "cash" position with the totalizer selecting shaft moved to the zero or grand total position by the mechanism shown in Fig. 13.

Fig. 16 is a detail view in rear elevation of the tensioning means forming a part of the mechanism shown in Fig. 17.

Fig. 17 is a detail view of the means for partially disengaging and reengaging the totalizer relatively to its actuators on transfer total operations.

Figs. 18 and 19 are details of the yoke mechanism shown in Fig. 17.

Figs. 20 and 21 are detail views of a part of the mechanism shown in Fig. 17, in its different positions.

General description

The type of machine disclosed in the above-mentioned patents, and to which the present invention is shown applied, includes, generally, a plurality of totalizers, control keys, and differential mechanism associated therewith for selecting the desired totalizer; a plurality of banks of amount keys and differential mechanisms associated therewith for adding amounts set up thereon into the selected totalizers, and total and sub-total control mechanism.

Printing mechanism may be provided for the purpose of printing on one or a plurality of record materials, the various amounts registered and the totals and sub-totals accumulated on the various totalizers. Machines of this type may be also equipped with indicators for displaying the above data to the public upon operation of the machine.

Heretofore, in machines of this type, provided with one or more lines of interspersed totalizers, it has been impossible to preserve a grand total in one totalizer of a single line, of the amounts accumulated on one or more of the several remaining totalizers in the same line, due to the fact that only one totalizer on the line could be engaged with the actuators at a time. When these totalizers were reset to zero, the totals thereon disappeared. The present invention is designed to enable amounts on all, or certain, of the totalizers, when said totalizers are reset to zero, to be automatically transferred to and accumulated on a grand totalizer located on the same totalizer line.

This machine is, therefore, admirably adapted for use in places of business where it is desired to classify several distinct transactions and distribute the amounts involved in these transactions to individual totalizers. These totalizers may be reset to zero each day, and the total amounts which have been registered under the classifications "Cash", "Charge", "Received-on-account", "Paid-out", etc., totalizers, may be printed on the record material. These totals are automatically added onto the grand totalizer when the individual transaction totalizers are reset to zero, and the grand totalizer may be reset to zero at the end of each week or whenever it is desired to do so, it being necessary, with my invention, to provide but a single line of totalizers instead of two or more lines, as was heretofore necessary.

Keyboard

Figure 24:
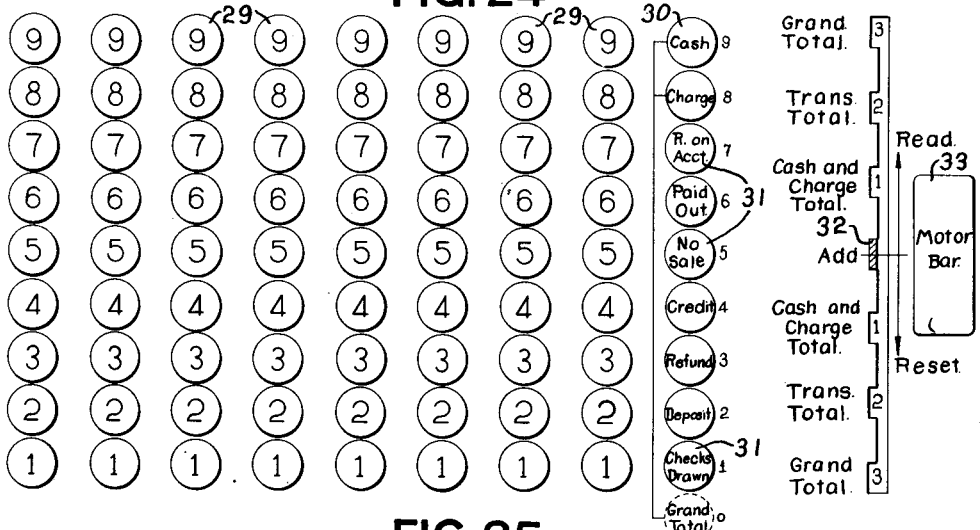
Fig. 24 is a diagrammatic view of the keyboard arrangement.

The keyboard of the present machine (shown diagrammatically in Fig. 24) is substantially the same as those disclosed in the machines of the patents above referred to, and includes a plurality of banks of amount keys 29 (Figs. 1 and 24), a bank of transaction keys 30 and 31 (Figs. 2, 3 and 24), a total control lever 32 (Figs. 3, 4, 10, 21 and 24) and a motor release bar 33 (Figs. 6 and 24).

Amounts to be entered on one or another of the plurality of totalizers in the machine are set up by depressing the appropriate amount keys 29 (Figs. 1 and 24) arranged in denominational banks, which in the present illustration, accord with the decimal system of notation. Each of these banks of keys 29 is provided with a differential mechanism, the purpose of which is to differentially position the corresponding actuators to add into the denominational wheels of the selected totalizer, the amount set up on the amount keys.

The transaction keys 30 and 31 (Figs. 2, 3 and 24) control the selection of the totalizers into which the amounts set up on the amount keys are to be added.

The lever 32 (Figs. 3, 4, 10 and 24) is the well known total control lever provided in machines of this type to control the machine for adding, total and sub-total taking operations.

In entering a transaction, the operator depresses the amount keys 29 representing the amount to be entered, and then depresses a transaction key 30 or 31 to select the totalizer into which the amount shall be entered, after which the machine is released for operation by depressing the motor bar 33 (Figs. 6 and 24).

Amount keys

The amount keys 29 of each row or denomination (Fig. 1) are slidably mounted in a denominational key frame 34 supported on the cross rods 37 and 38 extending between the side frames 35 and 36 (Fig. 23) of the machine. Each key 29 has a shoulder 28 thereon adapted, when the key is depressed, to crowd past a corresponding flattened pin 39 of a series of pins carried by a key detent bar 40 pivotally mounted at its upper end on an arm 41 swung from the key frame 34, and similarly connected at its lower end to an arm 42 also pivoted in the key frame 34. A spring 49 connected to a lateral extension of an arm 44 fast on one end of a short shaft 45 journaled in a depending portion of the key frame 34, presses a pin 43 carried by the arm 44 against the arm 42 supporting the lower end of the detent bar 40, to restore the bar to its normal position.

When a key 29 is depressed, the inclined edge of the shoulder 28 thereon wipes past its pin 39 and shifts the detent bar 40 endwise until the shoulder on the key has passed the flattened face of the pin 39, whereupon the spring 49 returns the detent bar to locate the pin 39 over the shoulder 28 on the key, in which position the key will be held until released either manually, or automatically, upon operation of the machine, as hereinafter explained.

When the depressed key 29 is released, as hereinafter described, the spring 49 rocks the arm 44 clockwise, and presses the projection 43 against the arm 42 to rock the latter counter-clockwise and restore the detent bar 40 to its normal position.

*Amount differential mechanism*

Associated with each bank of amount keys is a differential mechanism, the form and purpose of which are old and well known in the art, but of which a brief description will now be given.

The differential mechanisms for the amount banks each include a pair of differentially movable, annular spiders 50 journaled on a stud 51 supported between irregularly shaped hangers 48, only one of which is shown, which hangers are mounted on cross rods 52 and 53 extending between the machine side frames 35 and 36. Arcuate racks 74 are secured between each pair of annular spiders 50, there usually being three such racks equidistantly spaced about the peripheries of the annular spiders to co-act with totalizers on three lines, as shown in the patents heretofore referred to.

Since the present invention relates to but a single line of totalizers, the remaining two lines usually shown, are omitted, it being understood that they may be provided, together with their control keys and mechanism, without departing from the spirit and scope of this invention.

Coinciding projections 47 extend radially from the peripheries of the annular spiders, to which projections is pivoted the usual bell crank 56, cooperating with a link 55 arranged parallel with one arm of the bell crank 56 and pivoted to the pair of spiders 50, to pivotally support a latch 54. A spring 70 normally holds the foot on the inner end of the latch 54 against a shoulder 60 formed on an apertured drive sector 57 journaled concentrically with its respective actuator, to connect the actuator 50, 74 with the invariably movable drive sector. A pair of cams 58 pinned on the main drive shaft 59, actuates the drive sector 57, to impart thereto an excursion, first clockwise and then counter-clockwise, at each operation of the machine. The cams 58 cooperate with rollers 64 carried by a lever 65, pivoted on a hanger 48 and connected at its upper end by a link 66 to the drive sector 57. The shaft 59 makes one complete rotation in a clockwise direction on each operation of the machine.

It will be understood that there are at least as many drive sectors 57 and actuators as there are denominations represented by rows of keys on the keyboard.

In an adding operation, the drive sector 57 on its clockwise travel, carries the latch 54 and the actuator 50, 74 with it until the forwardly extending headed arm of the latch-supporting bell crank 56 strikes and is arrested by the inner end of a depressed key 29, which causes the bell crank to rock counter-clockwise to disconnect the latch 54 from the drive sector 57 which continues its clockwise travel to its constant limit of movement. When the latch is thus disconnected, the forward end or nose thereof enters the appropriate one of a plurality of notches or seats 67 formed in an arcuate rib 68 mounted on the cross rod 52, and having its upper end fast on an upwardly extending portion of the hanger 48.

Entry of the nose of the latch into a seat 67 locks the latch and the actuator where adjusted, and the drive sector 57, as it completes its excursion in clockwise direction, brings its outer periphery against the foot of the latch to maintain the nose of the latter seated in locked position.

If no key 29 is depressed in a bank, the corresponding latch 54 and its actuator 50, 74 will be disconnected from the drive sector 57 when the actuator is in its zero position, by contact of the nose 71 of a goose neck projection 72 (Figs. 1 and 7) carried by a spider 77 journaled on the stud 51, with a zero stop pawl 46 fast on the spring-pressed shaft 45 in the key frame 34. The nose 71 on the projection 72 has a slot therein through which projects a pin 73 mounted in the headed end of the latch-supporting bell crank 56, so that arrest of the projection 72 is equivalent to arresting the headed end of the bell crank 56.

The zero stop pawl 46 normally lies in the path of the nose 71 on the projection 72 to effect disconnection of the actuator from its drive sector in the zero position, but depression of any key 29 in the corresponding row shifts the detent bar 40, as heretofore explained, and presses the lower detent bar supporting arm 42 against the pin 43 on the arm 44 to rock the arm 44 and its short shaft 45, which shifts the zero stop pawl 46 out of the path of the nose 71.

Other means to shift the zero stop pawl to idle position in total-taking operations will be later referred to.

The spider 77 also cooperates with other mechanism hereinafter explained, to arrest the actuators 50, 74 under control of the usual high tooth on the totalizer pinion in total taking operations.

On its return movement, the wall of the aperture in the drive sector 57 contacts a stud 69 on the actuator 50, 74, and at the same time, shoulder 46 of the drive sector escapes the foot of the latch 54, whereupon the spring 70 restores the latch 54 to its normal position, and enables the drive sector, by its contact with the stud 69, to restore the differentially movable actuator in counter-clockwise direction to its normal position below the zero position.

Shortly after the latches 54 are disconnected from the drive sectors 57 by contact with the inner ends of the depressed keys 29, the selected set of totalizer pinions 75 is rocked into engagement with the variously positioned racks 74, by means to be hereinafter described, so that as the racks 74 are returned to their normal positions, the amounts, as determined by the keys depressed, are accumulated on the totalizer pinions.

Indicating and printing mechanism

To differentially adjust the indicators and printing mechanism, beams 80 are pivoted at their forward ends to their respective differentially movable actuators 50, the rear ends of the respective beams being bifurcated to straddle studs 79 mounted intermediate the ends of links 81. These links 81 at their lower ends are, respectively, pivoted to arms 82 loosely mounted on a shaft 83 extending between the side frame 36 and a printer side frame (not shown). Spiral segment gears 84 journaled on the shaft 83 and connected to the respective arms 82, mesh with spiral pinions 85 pinned on the adjacent ends of shafts 86 connected with type carriers, not shown. The differentially movable actuators 50, in combination with rolls 76 on the transmitting levers 65, adjust the beams 80 and connected mechanisms to variously position the type carriers according to the values of the keys depressed.

At their upper ends, the links 81 are pivoted to aligner segments 87 with which an aligner 88 cooperates. The aligner 88 is mounted on a plurality of arms 89, fast on a shaft 90, and may be operated by any suitable means. The aligning segments 87 each have teeth 91 formed thereon to adjust the indicators (not shown) to positions corresponding with the values of the depressed keys.

The printing mechanism and the indicator mechanism referred to above are old and well known in the art, and no further description is thought necessary, as a complete disclosure thereof may be obtained by reference to the patents of Fuller and Shipley, referred to above.

Totalizers

As heretofore stated, while machines of the type illustrated are equipped with a plurality of lines of totalizers arranged concentrically around the single set of actuators 50, as shown in the patents referred to, it is necessary to refer to but a single line of totalizers to obtain an understanding of the present invention, and the remaining lines have been omitted for the sake of clearness.

The machine illustrated has nine totalizers, (Fig. 23), one for each of the nine transaction keys 30 and 31, (Figs. 2, 3 and 24) except the "no-sale" key in the "5" position, and one selected by the zero stop pawl 108 associated with the bank of transaction keys. Each of these totalizers comprises a plurality of pinions 75, (Figs. 1 and 23) interspersed on a tube 216 mounted at its opposite ends in arms 217 and 218 (Fig. 23) journaled upon and slidable along a shaft 219. The ends of the shaft 219 enter guide slots 209 (Fig. 4) formed in cam plates 220 and 221, secured to the inner faces of the side frames 35 and 36. Arms 243 and 244 (Figs. 4, 5, 17, 18, 20, 21 and 23) are fast on the shaft 219 near the opposite ends thereof, the free ends of which arms carry rolls or projections 245 adapted to traverse cam slots 250 formed in the cam plates 220 and 221, respectively, and it is obvious that rocking of the cam arms 243 and 244 and shaft 219 will cause the projections 245 to follow the cam slots 250 to engage and disengage the totalizers relatively to the actuator racks 74. The free end of the arm 218 (Figs. 2 and 23) is slotted to embrace a lug 222 secured to the adjacent hanger 48, to prevent the arms 217 and 218 from turning on the shaft 219.

A rod 223 connects the tails of the arms 217 and 218 to space the arms apart the proper distance; and these arms 217 and 218, the rod 223, and the tube 216 upon which the totalizer pinions 75 rotate, form a frame slidable axially on the shaft 219 for the purpose of bringing any desired set of pinions 75 into operative relation with the actuator racks 74 (Fig. 1), as is old and well known in the art.

Totalizer selection

Figure 2:
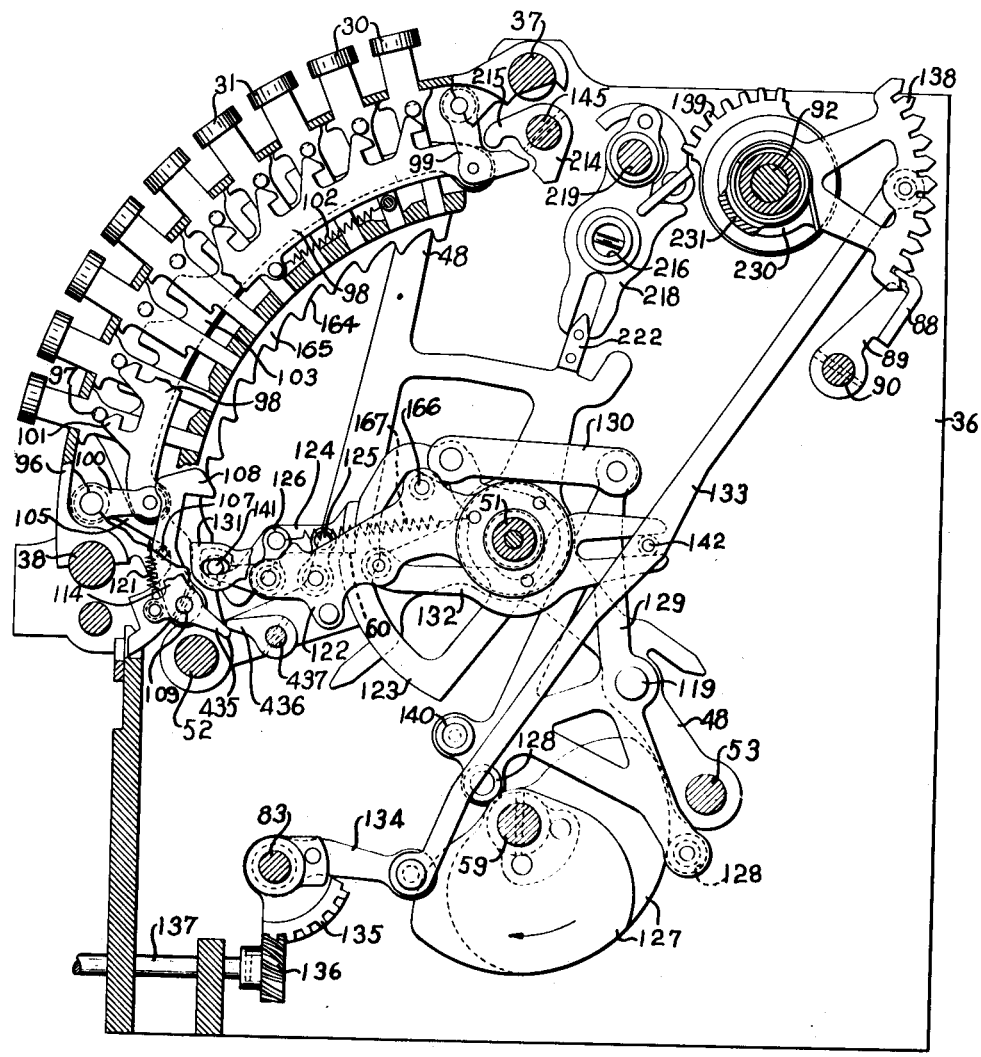
Fig. 2 is a sectional view taken through the machine, to the right of the bank of transaction keys.
Figure 3:
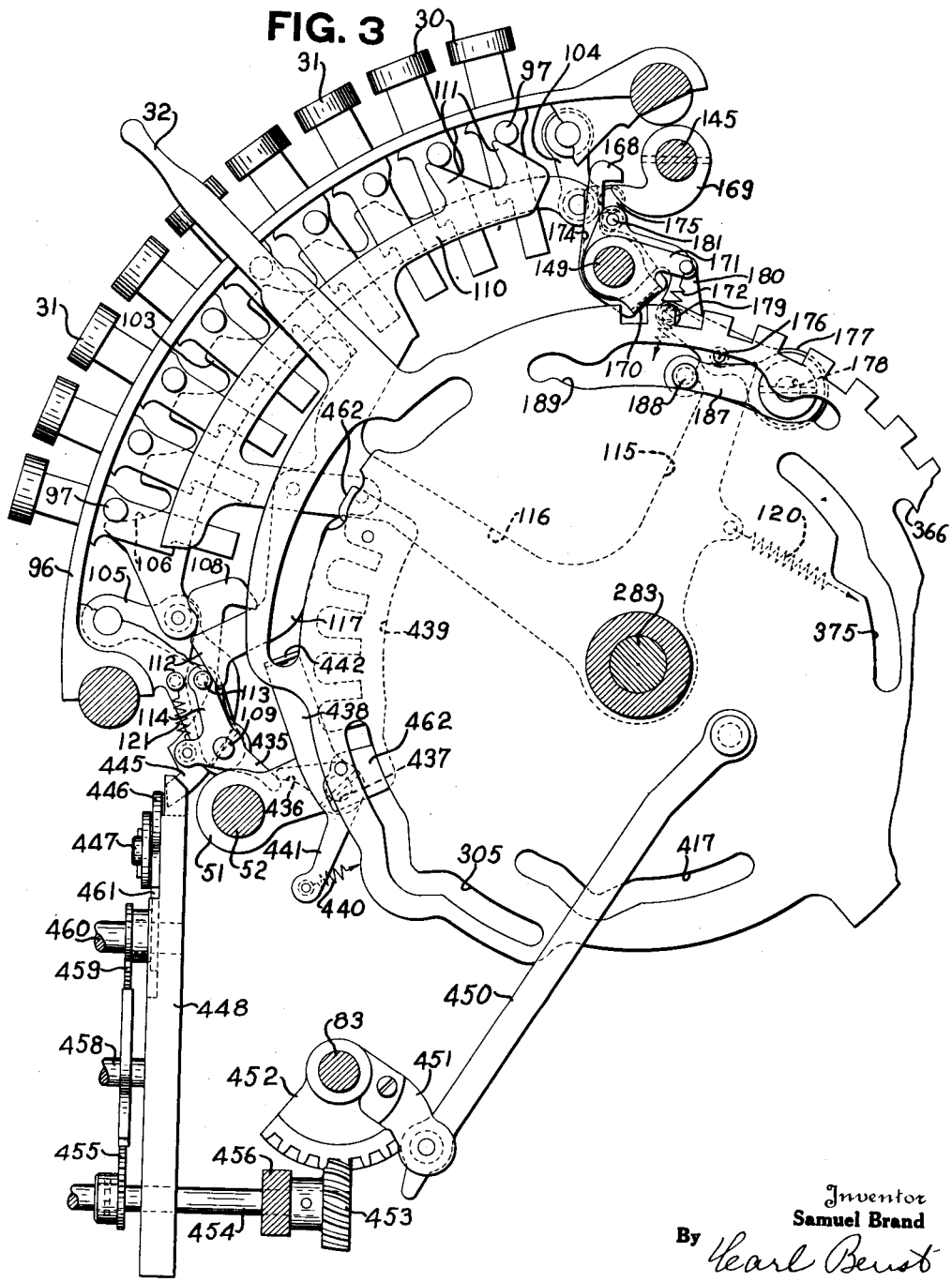
Fig. 3 is a similar view showing the bank of transaction keys, the total control lever, and the interlocking mechanism associated therewith.
Figure 23:
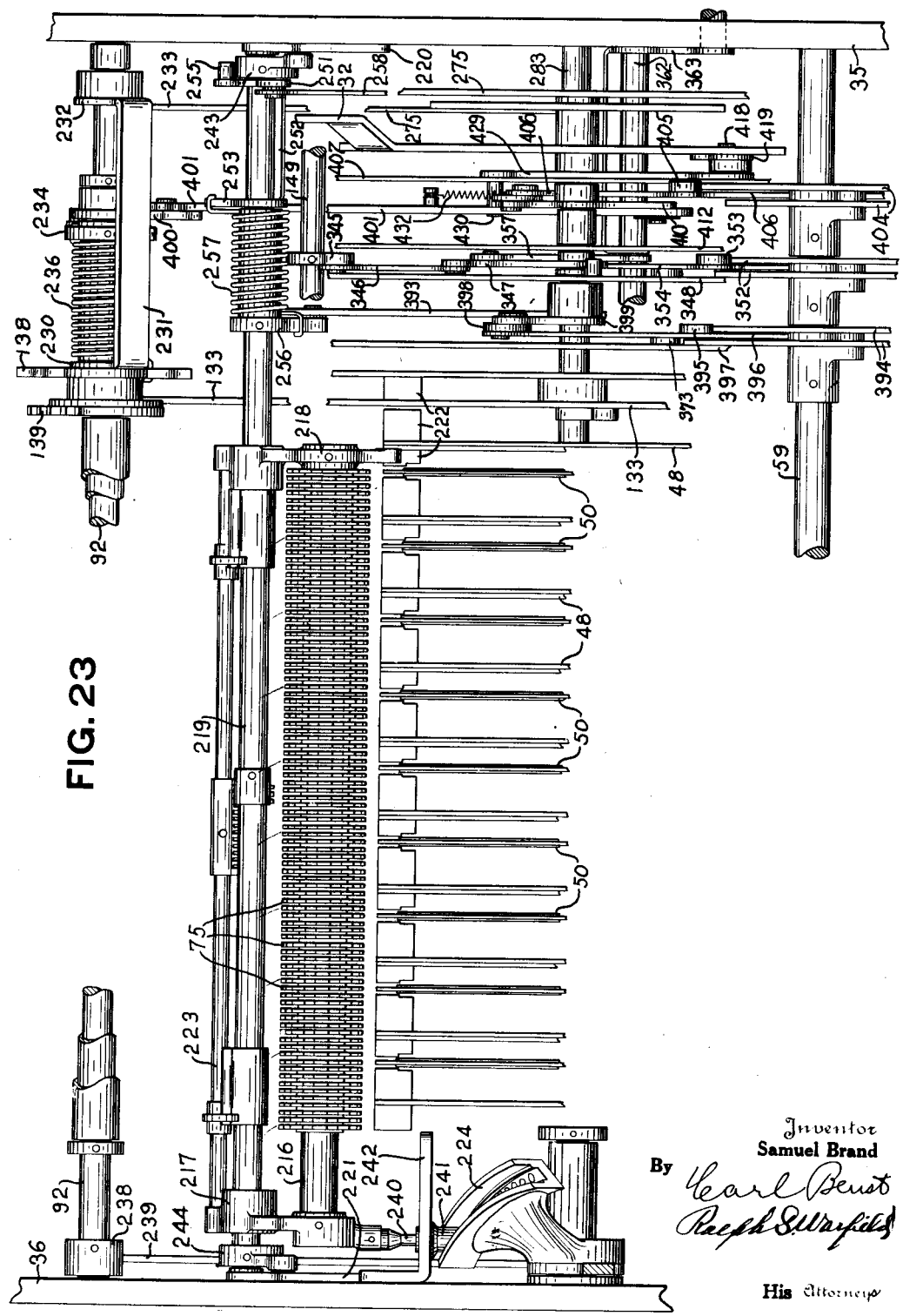
Fig. 23 is a view in front elevation of the totalizer line, together with the various mechanisms associated therewith for the purpose of selecting, engaging and disengaging said totalizers relatively to their actuators.

Bearing in mind that the line of totalizer pinions 75 shown in Fig. 23, forms a plurality of interspersed totalizers, means is provided to select any desired one of such totalizers for operation, such means being conveniently controlled by the transaction keys 30 and 31 (Figs. 2 and 3).

These transaction keys are slidably mounted in a key frame 96 similar to the key frame 34 for the amount keys 29, the key frame 96 being also supported in the machine on the cross rods 37 and 38. Each of the keys 30 and 31 has a pin 97 mounted in the shank thereof to cooperate with the hooked detents 101 arranged in series on the usual detent bar 98 shiftably supported on the frame 96 by the pivoted arms 99 and 100.

Depression of any of the keys 30 or 31 causes its pin 97 to wipe past the inclined edge of that hooked detent 101 opposite the particular key depressed, to shift the detent bar 98 downwardly. As soon as the pin 97 has passed the hooked end of the detent, a spring 102 returns the detent bar towards its normal position, thus hooking the detent over the pin on the depressed key to retain the key in its depressed position until it is released as hereinafter described.

The pins 97 on the keys 31 extend through the shanks of the keys to also cooperate with a control bar 103 (Figs. 2 and 3) adjacent thereto along the opposite sides of the keys and shiftably supported in the key frame 96 by the swinging arms 104 and 105. Depression of any of the keys 31 causes the pin 97 thereon to contact the appropriate inclined surface 106 of the series of such inclines formed on the control bar 103 to shift the control bar downwardly also. The control bar 103, when shifted by depression of the key, rocks clockwise the hooked arm 105 supporting the lower end of the control bar and presses it against a pin 107 projecting from the zero stop pawl 108, as seen in Fig. 2, to rock the zero stop pawl counter-clockwise to its ineffective position. The stop pawl 108 is pinned to a short shaft 109 carried by a downwardly extending portion of the frame 96.

The keys 30, which are the "charge" and "cash" keys, do not affect the control bar 103 due to the fact that the bar is cut away opposite these keys, as shown in Fig. 3. It is necessary, however, that these keys 30, upon depression, shall rock the zero stop pawl 108 to its ineffective position, to which end, there is provided a separate arcuate control bar 110 (Fig. 3) carried by an arm 116 pivoted concentrically with the actuators 50 and just to the right of the bank of transaction keys. Inclines 111 on the special control bar 110 lie in line with the pins 97 on the keys 30, so that upon depression of the keys 30, the control bar 110 is rocked counter-clockwise. A leg 117 depending from the special control bar 110 terminates at its free end in a foot 112 to contact a pin 113 on an arm 114 pinned to the shaft 109 to which is pinned the zero stop pawl 108.

The special control bar 110, when rocked counter-clockwise, causes the foot 112 to strike the pin 113 and rock the arm 114, shaft 109, and consequently the zero stop pawl 108, counter-clockwise to render the stop pawl ineffective to arrest the differential arm 122 (Fig. 2), which co-acts with the pawl or with the inner end of the particular transaction key depressed.

The depressed key 30 or 31, when released by its detent 101, is returned to normal undepressed position by a spring, not shown.

As soon as a depressed key 30 (Fig. 3) has been released, the control bar 110 is restored to its normal position by a spring 120, one end of which is secured to an upwardly extending arm 115 connected to the arm 116 which carries the control bar 110. Likewise, a spring 121 connected to the arm 114, restores the zero stop pawl 108 to its normal effective position, and through the pin 107 (Fig. 2), rocks the supporting arm 105 counter-clockwise to restore the control bar 103 for the keys 31 to its normal position.

*Transaction differential mechanism*

Associated with the bank of transaction keys 30 and 31 is a differential mechanism similar to that associated with the amount keys 29 heretofore explained. A latch 124 (Fig. 2) pivotally supported on a swinging arm 125 and one arm of a bell crank 126 mounted on a differentially movable arm 122, connects the differential arm with an invariably movable drive sector 123 in exactly the same manner as does the latch 54 of the amount bank of keys 29.

A pair of cams 127 (Fig. 2) fast on the main drive shaft 59 cooperate with rollers 128 mounted on a transmitting lever 129 pivoted at 119, and connected at its upper end by a link 130 to the sector 123, to impart an invariable oscillation to the drive sector at each operation of the machine.

As the drive sector 123 rocks in clockwise direction, it carries with it the differential arm 122 due to the latch connection 124, until the headed free end of the forwardly extending arm of the bell crank 126 contacts the inner end of a depressed key 30 or 31, whereupon, as the drive sector continues its travel, the bell crank 126 rocks counter-clockwise, to disengage the foot of the latch 124 from the shoulder on the drive sector 123, and simultaneously engage the forward end of the latch with the proper notch 164 of the series formed in an arcuate rib 165 supported at its lower end on the cross rod 52, and fastened at its upper end to the supporting hanger 48 for this bank. After the latch is disconnected from the drive sector 123, the latter completes its clockwise movement, and on its return travel picks up the differential arm 122 by the stud 166 on the arm, to restore the arm to its normal position. A spring 167 returns the latch 124 to its normal position against the shoulder 46 on the drive sector 123.

If no key is depressed in the transaction bank, the latch will be disconnected from its drive sector, by the contact of a goose neck 131 (a fragment only of which is shown in Fig. 2) with the zero stop pawl 108. The goose neck 131 corresponds with the goose neck 72 of Fig. 1, and projects from a spider, like the spider 77 (Fig. 7) pivoted on the stud 51, and lies in the same plane with the zero stop pawl 108. The goose neck 131 is slotted to accommodate a pin 141 projecting from the forwardly extending arm of the bell crank 126 to enable it to control the latch 124.

A beam 132 (Fig. 2) is pivoted at its forward end to the differentially adjustable arm 122, the rear end of the beam being bifurcated to embrace a stud 142 on a link 133, for the purpose of adjusting type carriers and indicators for the transaction bank, and also to select the totalizer corresponding to the key 30 or 31 depressed. The lower end of the link 133 is pivoted to an arm 134 journaled on the shaft 83, and having fixed thereto a spiral segment 135 meshing with a spiral pinion 136, pinned to a type carrier shaft 137. The manner in which the shaft 137 adjusts the type carrier in correspondence with the key depressed, is old and well known in this type of machine, and no further description is thought necessary.

At its upper end, the link 133 is pivoted to a toothed aligning segment 138 adapted to be engaged by an aligner bar 88 carried by a plurality of arms 89 pinned to a rock shaft 90 operable in any suitable manner, not shown. A segment 139 rigidly connected to the aligning segment 138 engages with suitable mechanism (not shown) to variably adjust an indicator in a manner old and well known in the art, and of which no further description is thought necessary herein, as it forms no part of the present invention. A roller 140 mounted on the transmitting lever 129 contacts the lower edge of the beam 132 to assist the differential arm 122 to position the beam according to the extent of travel permitted the differential arm before its arrest by the key 30 or 31 depressed.

Totalizer selection

The totalizers 75, together with their frames, are slidable by the differential mechanism under control of the transaction keys 30 and 31 (Fig. 2) along the shaft 219 (Fig. 23) to position any desired totalizer in line with the actuators 50 common to all the totalizers.

Referring to Fig. 2, it will be recalled that the indicator segment 138 for the row of transaction keys 30, 31 is differentially adjusted under control of the transaction keys. Heretofore, this indicator segment 138 was directly connected with well known means adapted to shift the line of totalizers axially of the shaft 219 to position that totalizer appropriate to the key 30 or 31 depressed, in line with the common actuators 50.

As one means to attain the results desired by the present invention, however, a flexible connection between the differentially adjustable indicator segment 138 and the means which shifts the line of totalizers, is substituted for the positive connection of the prior art.

In consequence, one end 230 (Figs. 2, 12-15 and 23) of a yoke 231 is pinned to the segment 138, the opposite end of which yoke terminates in an arm 232 journaled on the indicator shaft 92.

An arm 234 (Figs. 12-15 and 23) fast on the shaft 92, carries a toe 235 adapted to be held in contact with the yoke 231 by a strong spring 236 coiled about a spacing collar 237 surrounding the shaft 92, one end of the spring engaging the arm 234 fast on the shaft 92, and the other end of the spring engaging the segment 138. It can be seen that, as the segment 138 is differentially adjusted in clockwise direction (Fig. 13) under control of the transaction keys 30 and 31, it will operate through the spring 236 to similarly adjust the arm 234 and the shaft 92 a like distance. A link 239 (Fig. 23) connects an arm 238 fast on the opposite end of the shaft 92 with a spiral drum cam 224 journaled on a stud projecting from the left side frame 36 of the machine. The arm 217, which forms a part of the longitudinally shiftable totalizer frame, carries, at its inner end, a rod 240 projecting through a bearing 241 slidable laterally in a guide bracket 242, secured to the left side frame 36 of the machine, the bearing 241 being embraced by the walls of the drum cam 224, by which it is shifted as the cam is differentially rocked in one direction or the other. The bearing 241 forms an operative connection between the drum cam 224 and the totalizer frame.

As the shaft 92 is rocked by the transaction differential mechanism, as explained above, it will, through the arm 238 and link 239, variously adjust the cam 224 according to the position of the transaction key 30 or 31 depressed, and the cam, as can be seen from Fig. 23, will shift the totalizer frame to position the totalizer pinions 75 corresponding to the key depressed opposite the actuators 50, 74.

The drum cam 224, and consequently, the totalizer frame with its totalizers, remain where adjusted, until readjusted under the control of another of the transaction keys 30 and 31.

Totalizer engaging on adding operations

The drive sectors 57 (Fig. 1), after advancing the totalizer actuators 50, 74 to their variously adjusted positions, and then completing their own invariable extent of travel away from their home positions, are restored to their home positions by the cams 58 and connected linkages, picking up the actuators as they return, and it is just prior to such restoration, on adding operations, that the selected set of totalizer pinions 75 is engaged with its actuators, so that, as the actuators are returned by their drive sectors, the amounts set up on the keyboard will be added onto the totalizer.

Upon the arrival of the actuators 50 in their home positions, the totalizer is disengaged therefrom and returned to its normal position. Heretofore, the means cooperating with the arms 243 and 244 (Fig. 23), to hold the totalizers 75 out of engagement with their racks 74, has been connected directly to such arms, but in adapting the present invention to this machine, it was found desirable to arrange for a control of the totalizers that would enable them to be rocked out of and into engagement with their racks at a time when, according to the former patents, they were either to be wholly disengaged from their actuators, or held engaged therewith, depending upon whether a totaling and clearing or a sub-totaling operation was in progress.

Such novel mechanism forms a flexible connection between the means which positively disengages the totalizers 75 from their racks 74, and the cam arms 243 and 244, one such embodiment including a yoke 252 (Figs. 16–19) journaled on the shaft 219 adjacent the cam arm 243, which latter carries a projecting lug 254 normally in the path of a projection 255 on the neighboring arm 251 of the yoke 252. A strong spring 257 coiled about the shaft 219, flexibly connects the remaining arm 253 of the yoke 252 with an arm 256 (Figs. 16 and 19) pinned to the shaft 219, and being under tension, turns the yoke 252 in clockwise direction (Figs. 17 and 18) to press the projection 255 of the yoke arm 251 against the lug 254 of the cam arm 243. As the cam arm 243 and the arm 256 are both fast on the shaft 219, the tendency of the spring 257 to rock the arm 243 and its shaft in one direction, is offset by the tendency of the spring to rock the arm 256 in the opposite direction.

A link 258 (Figs. 4, 5, 16, 17, 18, 20 and 21), depending from the arm 251, carries a stud 259 which normally lies in the transversely extending offset 249 of an arcuate slot 274 formed in a skeletonized guide plate 275 stationarily mounted on the cross rods 52 and 53. As this plate is well known in machines of this type, a fragment only is shown in Figs. 4 and 23.

Figure 4:
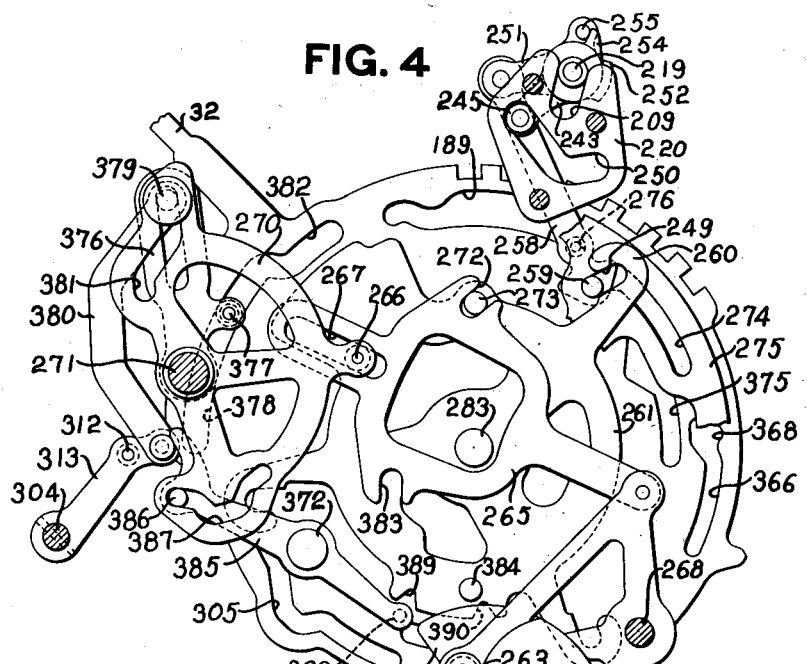
Fig. 4 is a detail side view of a part of the means for engaging and disengaging a line of totalizers, and controlling mechanism therefor.
Figure 5:
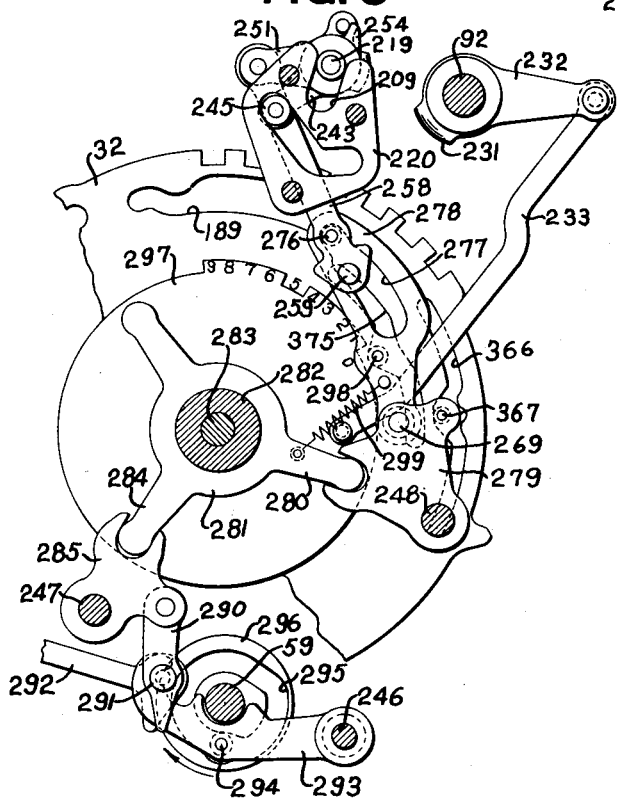
Fig. 5 is a detail side view of the mechanism for determining whether a totalizer on the totalizer line shall or shall not be engaged with the actuators.
Figure 10:
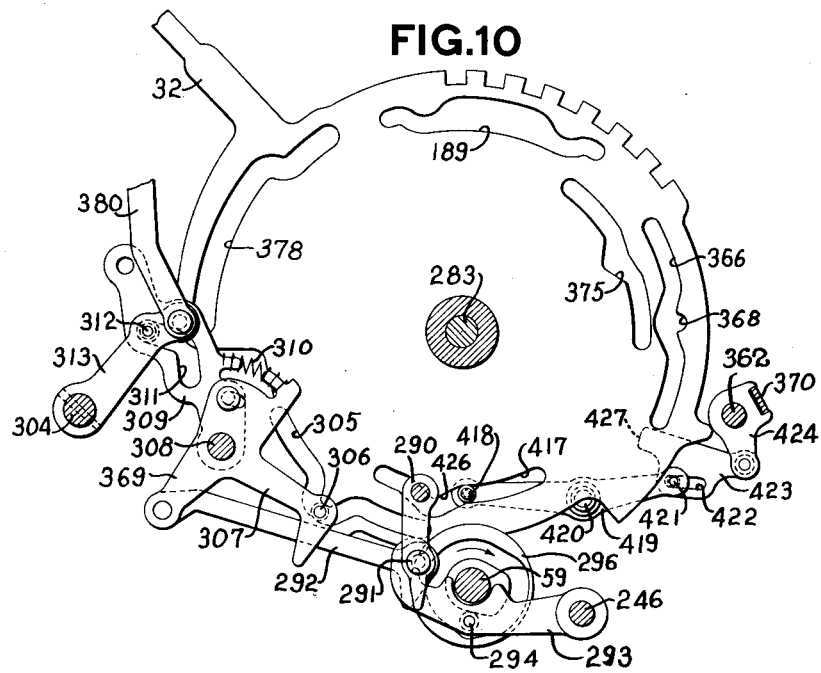
Fig. 10 is a detail view showing the total control lever and a part of the mechanism controlled thereby.

The stud 259, by contact with the wall of the offset 249, holds the link 258 at one limit of its travel to maintain the yoke 252 at the limit of its clockwise travel, as shown in Figs. 4, 5 and 17. And the yoke, through the contact of the projection 255 with the lug 254 of the cam arm 243, maintains the latter at the extreme limit of its clockwise travel, as determined by the cam slot 250. The arm 243, being fast on the shaft 219 carrying the totalizer arms 217 and 218 supporting the totalizers 75, retains the totalizers out of engagement with the racks 74.

Obviously, a downward pull on the link 258 will rock the yoke 252 counter-clockwise, thereby removing the projection 255 from the path of the lug 254 on the cam arm 243, and further tensioning the spring 257 which, acting through the arm 256, turns the shaft 219 counter-clockwise, and with it the cam arms 243 and 244, the rolls on the ends of which traverse the cam slots 250 in the cam plates 220 and 221, to draw downwardly the shaft 219 with its totalizer-supporting arms 217 and 218, and mesh the totalizers 75 with the racks 74. This engagement takes place in adding operations shortly after the differentially movable actuators 50 have been positioned under control of the depressed amount keys. Then, as the actuators 50 are restored to their normal positions, they rotate the engaged totalizer pinions 75 to accumulate thereon the amount represented by the keys 29 depressed, after which the link 258 is restored to its normal position to disengage the totalizer pinions 75 from the actuator racks 74.

Means for rocking the shaft 219 to engage and disengage the totalizers relatively to their racks 74, will now be described.

The stud 259 at the free end of the pivoted link 258 (Figs. 4 and 5) previously mentioned, is adjustable into or out of engagement with a hooked arm 260 projecting radially from a totalizer engaging and disengaging disk 261 journaled on a stud 283 projecting from the right-hand side frame 35 of the machine. A plurality of these hooks 260 may be arranged equidistantly around the disk to provide for an equal number of totalizer lines, only one of which is used in the present invention, however.

The bight of the hooked arm 260 normally lies in registry with the offset 249 of the slot 274 in the guide plate 275 and opposite the closed end of the offset, as shown in Fig. 4, to accommodate the stud 259 of the totalizer engaging and disengaging link 258, when the link is rocked counter-clockwise to shift the stud out of the offset into the slot 274.

The totalizer engaging and disengaging disk 261, is rocked first clockwise, and then counter-clockwise, to first engage the totalizer with its actuators, and then disengage it therefrom as follows.

A pair of cams 262 on the drive shaft 59 co-operate with rollers 263 carried by a transmitting lever 264 pivoted at 268 on the right side frame 35 of the machine. A pitman 265 is pivotally connected at one end to the upper end of the transmitting lever 264, the opposite end of the pitman being slotted at 267 to embrace a stud 266 projecting from a shifting lever 270 journaled at 271 on the right side frame 35 of the machine. The shifting lever supports and guides the pitman 265, which is enlarged intermediate its ends, the opposite sides of such enlargement being notched or recessed, as at 272 and 383, the notch 272 normally embracing a pin 273 mounted in the totalizer engaging and disengaging disk 261.

It will be remembered that the shaft 59 makes one clockwise rotation at each operation of the machine. This rotation of the shaft, and consequently of the cams 262, imparts to the transmitting lever 264 a movement of constant extent, first clockwise, and then counter-clockwise, on each operation of the machine, which causes the lever 264 to reciprocate the pitman 265, and through the pin connection 273 of the latter, rocks the disk 261 first clockwise and then counter-clockwise. It can be seen from Fig. 4, that if the stud 259 on the link 258 is engaged with the hooked arm 260, the link will be moved first clockwise and then counter-clockwise, guided by the slot 274 formed in the stationary plate 275. Clockwise travel of the link 258, as described above, will rock the arm 251 counter-clockwise to engage the totalizer pinions 75 with the actuator racks 74.

The mechanism is so timed that the actuators 50 are advanced to their differential positions under control of the depressed amount keys 29, after which the totalizer pinions 75 are engaged therewith, whereupon the drive members 57 restore the actuators 50 to their normal positions to add onto the totalizer pinions the amount represented by the depressed keys, after which the cams 262 (Fig. 4) rock the lever 264 to restore the pitman 265 to the left. This pitman, on moving to the left, rotates the disk 261 counter-clockwise to return the link 258 so that its stud 259 lies at the mouth of the offset 249, and in so doing, rocks the arm 251 and its yoke 252 (Figs. 16–19) clockwise (Fig. 4) to disengage the totalizer 75 from the actuators 50, preparatory to the next operation of the machine.

*Control of totalizers for engagement with their actuators*

As stated above, when the pin 259 on the totalizer engaging and disengaging link 258 is engaged with the hooked arm 260, the totalizer frame will be rocked to engage the selected set of totalizers 75 with the racks 74 just before the latter start to return to their home positions. If, however, the pin 259 remains in the position shown in Fig. 4, that is, disengaged from the hooked arm 260, the totalizer will not be engaged with the actuator racks, and consequently, nothing will be added thereon. Thus, if the "no-sale" key 31 (Fig. 24) is depressed, it is not desired that any of the totalizers 75 be engaged with the racks 74.

Mechanism for so controlling the engagement of the selected totalizer will now be described.

The drive shaft 59 (Fig. 5) carries a fixed cam disk 296 having a cam groove 295 in one side face.

A lever 293 pivoted at one end at 246 to the stationary guide plate 275 (Fig. 4) carries a projection 294 intermediate its ends, which extends into the cam groove 295.

Obviously, the cam disk 296, on its rotation with the drive shaft 59, will rock the lever 293 first counter-clockwise and then clockwise. The free end of the lever 293 is hooked to normally engage a stud 291 projecting from a link 290 depending from the bell crank 285 pivoted at 247 to the stationary guide plate 275.

The bell crank 285 is recessed to accommodate the outer end of a radial arm 284 projecting from a ring 281 rotatably mounted on a hub 282 surrounding the stud 283 projecting from the adjacent side frame 35, and on which the totalizer engaging and disengaging disk 261 is also journaled.

The outer end of a second arm 280 radiating from the ring 281, enters a recess formed in a second bell crank 279 pivoted at 248 to the stationary guide plate 275. One end of a floating lever 278 is pivoted at 269 to the bell crank 279, the lever 278 having an elongated opening 277 into which projects a stud 276 carried by the totalizer engaging and disengaging link 258 intermediate its ends.

Upon each operation of the machine, the shaft 59 and cam 296 (Fig. 5) receives one complete clockwise rotation. The configuration of the groove 295 is such that it will rock the lever 293 first counter-clockwise and then back to its normal position. This movement of the lever 293, through the link 290, rocks the bell crank 285 and with it the radial arms 284 and 280, first clockwise and then counter-clockwise to normal position. The arm 280, in turn, rocks the bell crank 279 clockwise and then counter-clockwise. The pin 259 on the totalizer link 258 normally lies at the closed end of the offset 249 (Fig. 4) of the slot 274 in the guide plate 275, and pin 276, also mounted on the link 258 behind the pin 259, seats in the outer restricted end of the opening 277 in the floating lever 278, and forms a fulcrum for the floating lever, which, when the bell crank 279 is rocked clockwise, as above described, rocks slightly counter-clockwise about the pin 276, as a centre, under the influence of a spring 299.

As hereinbefore described, the indicator segment 138 (Fig. 2) is differentially adjusted with the differential arm 122, and thus differentially adjusts the yoke 231 with its arm 232 (Fig. 5). A link 233 pivoted at its upper end to the arm 232 is connected at its lower end to a selector disk 297 having an uneven periphery of high and low portions. This disk is journaled on the hub 282 concentric with the multiple-armed ring 281, so that its periphery lies adjacent the floating lever 278, to coact with a fulcrum pin 298 projecting from the floating lever, and obviously, differential adjustment of the arm 232 effects a similar adjustment of the selector disk 297.

When the floating lever 278 rocks counter-clockwise during the first part of the operation of the machine, the pin 298 mounted therein shifts away from the periphery of the disk 297, to enable the latter to be adjusted differentially corresponding to the position of the transaction key 30 or 31 depressed. The lever 293 is then rocked clockwise to its normal position, which, through the link 290, bell crank 285 and multiple-armed ring 281, rocks the bell crank 279 counter-clockwise.

On such counter-clockwise travel, the bell crank 279 swings the lower end of the floating lever 278 clockwise with its fulcrum pin 298, about the pin 276 as a center, and if a high portion of the selector disk 297 has been positioned beneath the fulcrumed pin 298, the pin 298 contacts therewith and acts as a fulcrum for the floating lever 278, in place of the pin 276 on the link 258. Whereupon, the floating lever will rock clockwise with the fulcrum pin 298 as a center, and through the pin 276 in the totalizer link 258, projecting through the elongated opening 277 in the floating lever 278, rocks the link 258 counter-clockwise to engage the pin 259 with the hooked arm 260 (Fig. 4) of the totalizer engaging and disengaging disk 261.

If, however, a low spot on the selector disk 297 is positioned opposite the fulcrum pin 298, the latter is not arrested on the clockwise travel of the floating lever 278, and the totalizer link 258 and its pin 259 will remain in the positions shown in Figs. 4 and 5, being held therein by the spring 299 stretched between the floating lever 278 and the arm 280.

Figure 11:
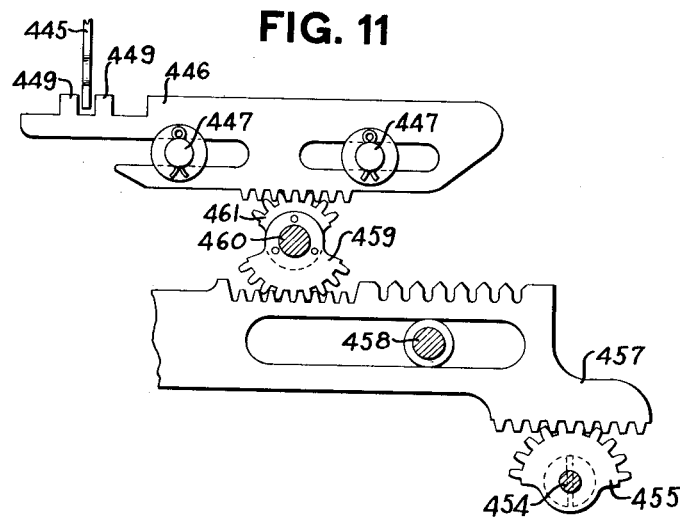
Fig. 11 is a detail view of a part of one of the interlocks between the total control lever and the transaction keys.

The totalizer engaging and disengaging cams 262 (Fig. 4) are arranged to commence effective operation at about the time the drive sectors 57 (Fig. 11) have reached their farthest limit of travel from home position and are about to return towards their home positions.

The cams 262 thereupon rock the transmitting lever 264 clockwise, drawing its pitman 265 to the right (Fig. 4), which results in turning the totalizer engaging disk 261 with its arms in clockwise direction, the hooked arm 260 drawing along the link 258, which, through the yielding train of connections heretofore explained, rocks the frame-supporting shaft 219 and arms 243 and 244. The rollers 245 on the free ends of the arms 243 and 244 are thus forced along the cam slots 250 in the cam plates 220, and in following the slots, draw the supporting shaft 219 inwardly or downwardly, together with the totalizer frame carried thereby, to mesh the selected totalizer with the advanced actuator racks 74.

These actuator racks, when restored to home positions, as heretofore explained, turn their respective totalizer wheels 75 to register thereon the amount set up on the keyboard, and after the actuator racks reach their home positions, the complementary one of the pair of cams 262 rocks the transmitting lever 264 to return the pitman 265 to the left, thereby rocking the totalizer engaging disk 261 counter-clockwise to its home position. The disk 261, as it returns, forces the link 258 upwardly (in Fig. 4) and through the yielding connections, rocks the supporting shaft 219 and its arms 243 and 244 clockwise. The rollers 245 are thus forced upwardly in the cam slots 250 to withdraw the engaged set of totalizers 75 from the actuator racks 74.

Obviously, all that is necessary to do to enable the transaction keys 30 and 31 to determine whether or not the totalizers shall engage their actuators, is to arrange the differential adjustment of the selector disk 297 under control of the keys 30 and 31, as to position a high spot opposite the fulcrum pin 298 whenever it is desired to effect engagement of the totalizers with their actuators.

By arranging that the "no sale" key 31 in the "5" position shall so adjust the mechanism that the selector disk 297 is positioned with a low spot on its periphery opposite the fulcrum pin 298, engagement of the totalizers 75 with their actuator racks 74 is prevented, the totalizer frame with its totalizers remaining in disengaged position throughout a "no sale" operation.

Operating means

The machine may be motor driven through a clutch mechanism and connections fully illustrated and described in the above-mentioned patents, or it may also be operated manually by a crank 464 shown in Fig. 6 in dot-and-dash lines for clearness. A pinion 463 turned by the crank, meshes with a gear 201 journaled on a stud 202 mounted in the side frame 35. The ratio of these gears is such that two clockwise rotations of the crank 464 and gear 463 will impart one-half of one counter-clockwise rotation to the gear 201, which, in turn, will impart one complete clockwise rotation to a gear 210 fast on the main drive shaft 59 and in mesh with the gear 201.

Release mechanism

The machine is normally locked against idle operations, the locking means being controlled by certain identifying keys, which arrangement enforces the setting of such keys so that each operation may be connected with a particular clerk, or in this instance, a particular transaction.

To this end, the machine is provided with a shaft 145, which is the well known release shaft common in this type of machine, and shown for example, in U. S. patent to Shipley, No. 1,619,796, March 1, 1927, heretofore referred to, particular reference being made to Fig. 2 of that patent, wherein the release shaft there designated 88 is shown, with its control of the machine locking mechanism.

Returning to Fig. 6 of the present invention, an arm 190 carrying a stud 191 is fast on the release shaft 145 near its right-hand end, the stud 191 extending through a slot 193 in a restoring link 192. A spring 194 normally compressed between the bottom of the slot 193 in the link 192 and the shoulders of a pair of identical retaining members 205 mounted on the stud 191 and disposed one on each side of the restoring link 192, tends to rock the release shaft 145 in clockwise direction (Figs. 3 and 6), but is prevented from so doing by the contact of a finger 169 fast on the release shaft, with a catch 168 pivoted on a shaft 149 supported in the side frames 35 and 36 of the machine. The catch 168 has a downwardly extending bifurcated tail which straddles a yoke 170 journaled on the shaft 149, one end of the yoke carrying a projection 171, to which is attached a spring 172 which holds the hooked catch 168 in normal locking position and returns the catch to its normal position at the end of an operation.

The opposite end of the yoke 170 includes an upwardly extending arm 174, normally lying in the path of a stud 175 carried by the arm 104, which supports the upper end of the control bar 103.

It will be recalled, that upon depression of any one of the transaction keys 31, the pin 97 mounted therein contacts with and causes the control bar 103 to move counter-clockwise, which rocks the supporting arm 104 clockwise. The supporting arm 104, when thus rocked, presses the stud 175 against the arm 174 to rock the latter, and consequently the catch 168, clockwise to displace the catch from the path of the finger 169 and free the release shaft 145 to the influence of its spring 194.

The provision of the catch 168 insures that a transaction or special key 30 or 31 be depressed before the machine can be released to operate.

The transaction keys 30, when depressed, have no effect upon the control bar 103. Therefore, to enable the keys 30 to release the catch 168, it is necessary to provide means operable by the keys 30 to displace the catch 168 from the path of the finger 169. As previously described, depression of one of the keys 30 rocks the control sector 110 counter-clockwise. The upwardly extending arm 115 of the control sector 110 terminates in a head which contacts a pin 176 mounted in an arm 177 to rock this arm clockwise. The arm 177 is fast on a short shaft 178 mounted in brackets, (not shown) fast on the hangers 48 (Fig. 2) for the transaction bank of keys. The arm 177 also carries a pin 179 adapted to contact a foot on an arm 180 journaled on the shaft 149 to rock this arm counter-clockwise.

A pin 181 carried by the arm 180 lies behind the catch 168 to rock it out of the path of the finger 169, and thus enable the motor bar 33 to release the machine for operation. To prevent operation of the machine until the starting key or motor bar 33 is depressed, a second lock for the release shaft 145 is provided, comprising a locking detent 148 (Figs. 8 and 9) pivoted on the shaft 149 and adapted to lie in the path of a stud 146 carried by an arm 147 fast on the release shaft 145.

The motor release bar 33 (Figs. 6 and 22) is removably attached to a slide 150 (Fig. 6) mounted on guide studs 151 projecting from the right side frame 35 of the machine. A pin 152 mounted in the slide 150 projects through an opening in the frame 35. A lever 153 pivoted at 163 on the inner face of the frame 35, is bifurcated at one end and straddles the pin 152. The opposite end of the lever 153 carries a pin 154 which cooperates with the bifurcated end of one arm 155 of a bail lever 157 loose on the shaft 149, the remaining arm 156 of which bail lever is hooked to take over a stud 158 on an arm 159 of a tripping bail lever 161 journaled on the release shaft 145. The remaining arm 160 of the tripping bale lever 161 is bifurcated to embrace a pin 162 projecting from the locking detent 148. When the motor release bar 33 is depressed, the connected bail levers 157 and 161 will be rocked to shift the locking detent 148 counter-clockwise out of the path of the stud 146, whereupon the spring 194 (Fig. 6) operating upon the arm 190, suddenly rocks the release shaft 145 clockwise to release the machine lock (not shown) and enable the main drive shaft 59 to be rotated.

The spring 194 (Fig. 6) expands and rocks the arm 190 and the release shaft 145 clockwise until arrested by contact of the tail of the arm 190 with a stud 196 in the side frame 35, at which time the stud 191 of the arm 190 lies at the upper end of the slot 193 in the restoring link 192.

Near the end of an operation, the release shaft 145 is rocked counter clockwise slightly past its normal position, and then clockwise to normal to release the depressed amount keys 29 and the transaction key 30 or 31, which are then restored to their normal positions as follows.

A restoring arm 198 (Fig. 6) pivoted at one end on a stud 197 projecting from the side frame 35, carries a roller 199 intermediate its ends which projects into a cam groove 200 in the side of the large drive gear 201. A stud 203 on the free end of the restoring arm normally lies in a laterally offset pocket communicating with an opening 204 in the restoring link 192.

The gear 201 turns through one-half of a rotation at each operation the machine, and the cam groove 200 therein is so shaped that near the end of each operation, it will rock the restoring arm 198 first clockwise and then back to normal position. Due to the engagement of the stud 203 with the link 192, the link will be given a quick reciprocation first down and then back to normal position. When the arm 190 is rocked clockwise by the spring 194, as above described, the stud 191 is positioned in the upper end of the slot 192. The restoring link 192, when drawn downwardly by the restoring arm 198, rocks the arm 190 and release shaft 145 with its locking arm 147 (Fig. 8) and locking finger 169 (Fig. 3) counter-clockwise past normal position, which will permit the detent 148 (Fig. 9) to be restored to its position in the path of the stud 146, and enable the catch 168 to again take over the finger 169.

As mentioned above, the release shaft 145 on such counter-clockwise travel, releases the depressed keys 29 and 30 or 31, as follows:

A rod 211 (Fig. 1) carried by a plurality of arms 212, pinned to the shaft 145, extends across the tails 213 projecting rearwardly from the upper arms 41 supporting the detent bars 40 of the amount banks of keys 29. The shaft 145, as it rocks counter-clockwise, presses the rod 211 into contact with the tails 213 of the arms 41, to rock the arms clockwise about their pivots and shift the detent bars 40 counter-clockwise to disengage the detent pins 39 from the shoulders 28 on the key stems, thereby releasing the keys which return to their normal positions under the influence of springs, not shown herein.

The depressed transaction keys 30 and 31 are released in a similar manner. A nose 215 on an arm 214 (Fig. 2) pinned to the shaft 145, normally lies immediately above the tail of the upper arm 99 supporting the detent bar 98. The release shaft 145, on its counter-clockwise travel, presses the arm 214 against the tail of the arm 99 and cams the arm 99 to the left, thereby moving the detent bar 98 to the left to disengage the detent hook 101 thereon from the pin 97 on the depressed transaction key, whereupon a spring (not shown) restores the depressed key to its normal undepressed position, all of which is old and well known in the art.

After the restoring arm 198 has drawn the restoring link 192 downwardly to the limit of its travel, the wall of the cam groove 200 in the large drive gear 201 rocks the restoring arm counter-clockwise to its normal position, which again raises the restoring link 192 and its spring 194, to press the spring against the stud 191 of the arm 190 on the release shaft 145 and rock the latter clockwise until the stud 146 (Figs. 8 and 9) abuts the locking detent 148 and arrests farther clockwise rotation of the release shaft before it can again release the machine for operation.

Such arrest of the release shaft 145 and its arm 190 occurs almost at the outset of the counter-clockwise rotation of the restoring arm 198, so that as the latter continues its own return, it forces the restoring link 192 upwardly and tensions the spring 194 to enable the latter to rock the release shaft clockwise and release the machine at the next operation.

*Total and sub-total control mechanism*

As has been pointed out heretofore, the machine in connection with which the present invention is illustrated, is very flexible in design and can readily be adapted to accomplish a wide variety of results, depending upon the requirements of the user, and the particular accounting system with which the machine is used.

Thus, in the usual form of machine having three lines of totalizers, indicated at 370 in Fig. 8 of Shipley patent, No. 1,619,796, heretofore referred to, the total control lever 137 (Fig. 1 of the patent) is adjustable to three positions above and three positions below its intermediate neutral or "add" position.

These three positions above and three positions below the "add" position are assigned to the three lines of totalizers, respectively. The total control lever, when adjusted to the first position below or above the "add" position, selects the upper totalizer line, for instance, for totaling or sub-totaling operations.

The total control lever when adjusted to the second position above or below the "add" position, selects the rear totalizer line for sub-totaling or totaling operations, and so on. If there were four lines of totalizers, there would be four positions above and below the "add" position to which the total control lever could be adjusted.

Figure 25:
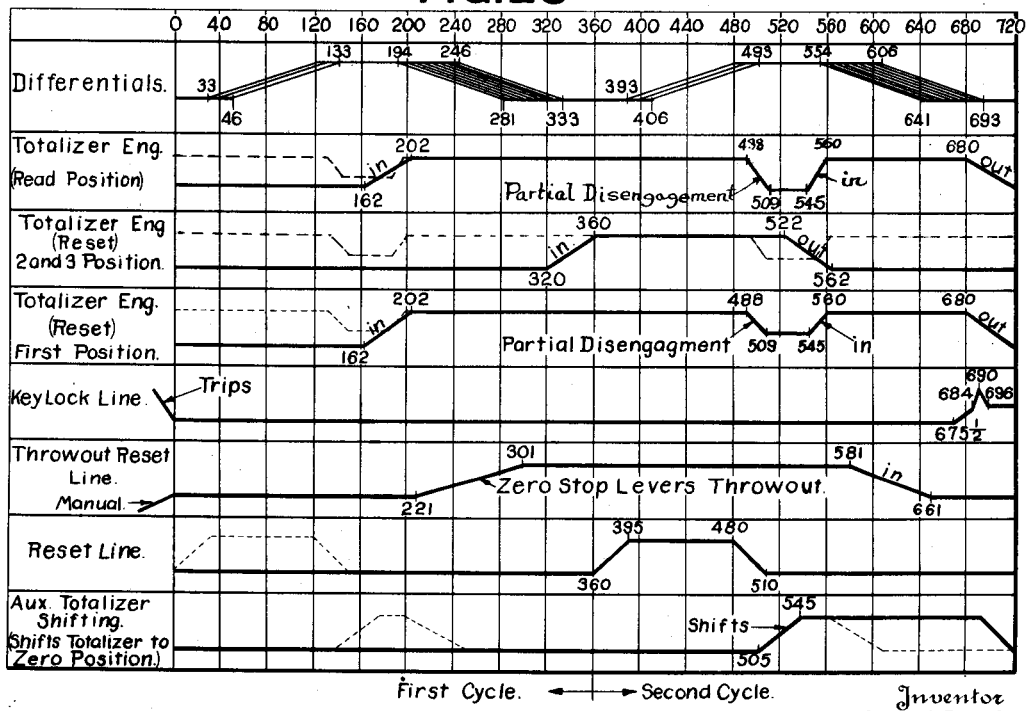
Fig. 25 is a timing chart for some of the cams.

The selection of the totalizer line is controlled by the configuration of the slots 538 (Fig. 25 of Shipley's patent) in the total control lever disk 295 (Shipley patent) which differ from each other to enable such selection.

In the present invention, but a single totalizer line is shown, and for that reason the total control lever is designed to select the same totalizer line when adjusted to any of its positions other than its "add" position.

This comparison illustrates the extreme ease and simplicity by which widely differing results can be obtained by what appear to be but slight changes in the design.

Thus, by arranging that the total control mechanism, in whatever position other than its "add" position, shall always select the same totalizer line, it is possible to "split" the transaction bank of keys 30 and 31 which control the selection of the particular totalizers on that line, so that certain of the transaction totalizers may be operated upon when the total control lever 32 is in its first position above or below "add" position; certain other totalizers controlled, when the total control lever is in its second position above or below the "add" position, and still another totalizer operated upon when the total control lever is in its third position above or below the "add"

position, all such totalizers being on the same line.

The present invention is closely related with the total control mechanism.

In the particular form of machine herein disclosed, the two keys 30 occupying the "eight" and "nine" positions in the first row of keys at the right of the keyboard, are known as the "charge" and the "cash" keys, respectively, the remaining keys 31 in that row relating to other kinds of transactions.

It is possible to take totals or sub-totals of the amounts registered on the particular totalizers selected by the keys 30 only when the total control lever 32 is in its first position below or above the "add" position, respectively.

Likewise, it is possible to take totals and sub-totals of the amounts on the totalizers selected by the keys 31 only when the total control lever 32 is in its second position below or above the "add" position.

And when the total control lever is in its third position above or below "add" position, a sub-total or total of a grand total totalizer is taken, means being provided to lock the transaction and totalizer-selecting keys 30 and 31 against depression when the total control lever is in either of these two positions.

There is a still further function obtainable in the form of machine herein illustrated, which is the automatic transfer of amounts from the totalizers 75 selected by the "Charge" and "Cash" keys to the grand total totalizer on the same line when the total control lever 32 is adjusted to its first position below the "add" position.

*Total lever control of release shaft lock at transaction bank*

On total taking operations when the total control lever is moved to the first position above or below the "add" position, it is necessary to depress one of the transaction keys 30, to select the particular totalizer to engage with the actuators. When the total control lever is moved to the second position above or below the "add" position, it is necessary to depress one of the transaction keys 31, to select the particular totalizer to engage with the actuators. Depression of a transaction key 30 or 31 will, therefore, displace the catch 168 (Fig. 3) relatively to the finger 169 to free the release shaft 145 for operation, in the manner heretofore described. However, when the total control lever 32 is moved to the third position above or below the "add" position, all the transaction keys 30 and 31 are locked against depression by mechanism later to be described, and the grand totalizer is automatically selected. Since no key is depressed, it is necessary on such an operation to provide means under the control of the total control lever for removing the catch 168 from the path of the finger 169 on the release shaft 145.

This mechanism comprises an arm 187 (Fig. 3) secured to one end of the shaft 178, to which shaft is also secured the arm 177, previously described. The arm 187 carries a pin 188, projecting into an opening 189 terminating in restricted cam portions at its opposite ends, which opening is formed in the total control lever 32. This opening is of such a width intermediate its ends as not to affect the arm 187 when the total control lever 32 is in the "add" position, or in its first position above or below the "add" position, and the arm 187 is free to shift clockwise under the influence of the control keys 30, as previously described.

In adjusting the total control lever 32 to the second position above or below the "add" position, the lower wall of the opening 189, being concentric with the pivot point of the lever, does not move the arm 187. The total control lever, however, when adjusted to either of these last named positions, shifts the opening 189 relatively to the stud 188 on the arm 187, to fit the mouths of the restricted ends of the cam slot over the stud to prevent clockwise movement of the arm 187 and the arm 177, which, in turn, will prevent counter-clockwise movement of the control bar 110, and consequently, prevent depression of the control keys 30.

The total control lever 32, when adjusted to its third position above or below its "add" position, automatically selects the grand totalizer. Interlocks, hereinafter described, prevent depression of the keys 30 and 31 when the total lever is in the third position. Adjustment of the total lever to the third position shifts the opening 189 relatively to the pin 188 on the arm 187, so as to fit the cam slots at the ends of the opening over the pin 188 and rocks the arm 187 clockwise far enough to remove the catch 168 from the path of the finger 169 and permit the release of the machine by depression of the motor release bar 33 only, as above described. The removal of the catch 168 is normally effected by depression of a key 30 or 31. But since the keys 30 and 31 are locked against depression when the total lever is moved to the third position, the removal of the catch is effected by the total lever direct, as just described.

*Total lever control of machine lock*

On total, sub-total and transfer total taking operations it is necessary that the drive shaft 59 be given two complete rotations instead of one, as in adding operations, to afford sufficient time for the parts to be conditioned and operated.

For convenience, any operation of the machine when the total control lever is in any of its positions out of "add" position, will be referred to generally as a total taking operation, since many of the functions of the machine are the same, and the parts to accomplish such functions operate in the same manner, irrespective of the kind or class of totaling operation being performed.

The selected totalizer is moved into engagement with the actuator racks 74 on the first rotation or cycle of operation of the drive shaft 59, and during the second rotation to the shaft, controls the extent of movement of the differentially movable actuators 50 and the actuator racks 74.

To enable the drive shaft 59 to make two rotations on total taking operations, the total lever 32 controls mechanism shown in Fig. 6 to delay the restoration of the motor drive disabling or machine lock, (not shown), to its normal effective position, until near the end of the second rotation or cycle.

This delaying mechanism includes a pitman 300 slidably mounted on the stud 202 which supports the large drive gear 201. At its left-hand end, the pitman 300 is pivoted to one end of a lever 301 loosely mounted on the stud 197. A link 302 connects the opposite end of the lever 301 with an arm 303 secured to a disabling shaft 304 supported in the machine side frames, and adapted to rock the zero arresting pawls 46 to their idle positions in totaling operations.

The total control lever 32, when shifted to any of its positions out of the "add" position, imparts the first of two successive rocking increments of movement in clockwise direction to the pawl disabling shaft 304, and near the end of the first cycle of a total taking operation, the shaft 304 is automatically given an additional step of clockwise movement.

The manner in which the total control lever 32 rocks the pawl disabling shaft 304 on the first of its two steps of movement in clockwise direction, will now be described.

The disk like body of the total control lever 32 is provided with an arcuate cam slot 305 (Fig. 10) into which projects a stud 306 carried by a lever 307 pivoted to the adjacent side frame 35 at 308. An arm 309 is also pivoted concentrically with the lever 307, and a spring 310 extends between the lever 307 and the arm 309. The arm 309 is provided with a slot 311, into which projects a stud 312, carried by an arm 313 fast on the disabling shaft 304 for the zero arresting pawls 46. The total control lever 32, when adjusted in either direction from the "add" position shown in Fig. 10, rocks the stud 306 and lever 307 counter-clockwise, movement of which compresses the spring 310 to also rock the arm 309 counter-clockwise. As the arm 309 is moved counter-clockwise, the walls of its cam slot 311 rock the stud 312 and its arm 313 in clockwise direction, and since the arm 313 is fast on the pawl disabling shaft 304, the latter is also rocked clockwise.

It can be seen from Fig. 6, that the pawl disabling shaft 304 on its clockwise movement will rock the arm 303 to shift the link 302 and rock the intermediate lever 301 clockwise, which slides the pitman 300 to the left. The pitman 300 carries studs 322 spaced apart to embrace an ear projecting from the outer end of a coupling bar 323, slidably mounted in a diametrically extending groove formed on the back or inner face of a cam disk 324 journaled on the stud 202 in front of the large drive gear 201, and in close proximity thereto. The coupling bar 323 is longitudinally slotted intermediate its ends to accommodate and slide relatively to the stud 202, and the ear projects outwardly across the periphery of the cam disk 324 which is recessed at this point to accommodate the ear when the latter and its coupling bar are in the normal idle position. A roller 325 mounted on the inner face of the pitman 300, normally occupies a notch offset from and communicating with a cam groove 326 formed in the side of the cam disk 324. The pitman 300, when shifted to the left, as above described, draws the coupling bar 323 to the left to enter its outer end in a recess formed in the large drive gear 201, and thus connect the cam disk 324 with the gear 201 so that they will rotate in unison. At the same time, the roller 325 on the pitman 300 is withdrawn from its notch, and into the groove 326 in the cam disk 324. The configuration of the cam groove 326 is such that, near the end of the first cycle of a total taking operation, the pitman 300 will be automatically given a second step of movement to the left and then, near the end of the second cycle, will be automatically restored. This additional movement of the pitman 300 operates through the intermediate lever 301, link 302 and arm 303, to impart an additional increment of movement in clockwise direction to the pawl disabling shaft 304.

A universal rod 327 (Fig. 1) mounted in a plurality of arms 328, fast on the pawl-disabling shaft 304, cooperates with the tails 329 on the arms 44, previously described, to rock the zero stop pawls 46 to their ineffective positions on total taking operations. The first step of movement of the disabling shaft 304 imparted by the total lever, when manually shifted as above described, will position the universal rod 327 immediately above the tails 329, and, when, upon operation of the machine on a total taking operation, as just described, the disabling shaft 304 automatically receives its additional step of movement in clockwise direction, the arms 328 press the universal rod 327 against the tails 329, and shift the zero stop pawls 46 to their ineffective positions. The amount differentials 50 are then free to be adjusted under control of the totalizer wheels 75.

The mechanism whereby the totalizer wheels 75 control the differential movement of the actuators during total taking operations will now be described.

*Totalizer engaging control on total taking operations*

In total taking and clearing operations, the selected totalizer 75 is engaged with the actuator racks 74, before the actuators are advanced clockwise. After the actuators have been differentially adjusted under control of the totalizer wheels 75, during which the wheels return to their "zero" positions, the totalizer is disengaged from the actuator racks, to leave the totalizer at zero. In sub-total taking operations, the totalizer is similarly engaged with the actuator racks before the actuators are advanced, and is continuously held in engagement therewith while the latter are being restored to their home positions, thereby re-accumulating upon the totalizer the amount which was taken therefrom. The mechanism for controlling the engagement and disengagement of the totalizer relatively to its actuators, on total and sub-total taking operations, will now be described.

As previously explained in connection with the adding operation, the totalizer engaging pitman 265 (Fig. 4) is moved towards the right at the beginning of each operation, and as the notch 272 in the pitman normally fits over the pin 273 on the totalizer engaging spider 261, the pitman rocks the spider clockwise to engage the selected totalizer with the racks 74 of the actuators 50 after the latter have been positioned under control of the amount keys 29. After the actuators 50 return to their normal positions near the end of the operation, the pitman 265 is shifted to the left to its normal position to disengage the totalizer from the actuators. In total and sub-total taking operations, however, the time of engagement and disengagement of the totalizer and actuators is different from that described in adding operations.

To this end, the disk-like body of the total control lever 32 (Fig. 5) is provided with a cam slot 366 which accommodates a pin 367 carried by the bell crank 279. The cam slot 366 is enlarged, as at 368 (Fig. 4) intermediate its ends, to afford room in which the pin 367 may move idly when the bell crank 279 is rocked during adding operations, at which time the total control lever is in such position that the widest part of its slot is adjacent the pin 367. When the total control lever 32 is adjusted to condition the machine for any totaling operation, the cam slot 366, through its engagement with the pin 367, rocks the bell crank 279 clockwise and shifts the floating lever 278 to the right, (Fig. 5), to move the fulcrum pin 298 carried thereby away from the periphery of the selector disk 297, and thus disable the usual totalizer engaging mechanism, there being then no co-action between the selector disk 297 and the floating lever 278 or the totalizer link 258 for engaging the totalizer with the differential actuators on total or sub-total taking operations.

It will be recalled that the total control lever 32 when shifted to any of its total taking positions, rocks the lever 307 (Fig. 10) counter-clockwise. A link 292 pivotally connects an arm 369 of the lever 307 with the link 290 (see also Fig. 5), which latter link connects the drive lever 293 and the bell crank 285, and carries the stud 291 releasably engaged by the hooked end of the drive lever.

The lever 307, on its counter-clockwise travel, will shift the link 292 towards the right, and swing the link 290 to disengage the stud 291 from the hooked drive lever 293. It will be remembered that the drive lever 293 is actuated by the cam 296 during adding operations, to engage the draft link 258 (Figs. 4 and 5) of the selected totalizer with the totalizer engaging spider 261. By disconnecting the link 290 from the drive lever 293, the connection between the cam 296 and the floating lever 278 is interrupted, thereby crippling the automatic means which controls the engagement and disengagement of the totalizer with the differential actuators. Therefore, it is desirable to provide means to enable the total control lever itself to control the totalizer engaging and disengaging means to insure that the totalizer shall engage the differential actuators at the proper time on total taking operations.

The total control lever disk 32 has a slot 375 (Figs. 3, 4, 5 and 10) through which projects the pin 298 on the floating lever 278. As above described, adjustment of the total lever 32 to any of its total taking positions will cause the walls of the cam slot 366 operating on the pin 367 (Fig. 5) in the bell crank 279, to rock the bell crank clockwise about its pivot 248 and shift the lower end of the floating lever 278 to the right.

Figure 1:
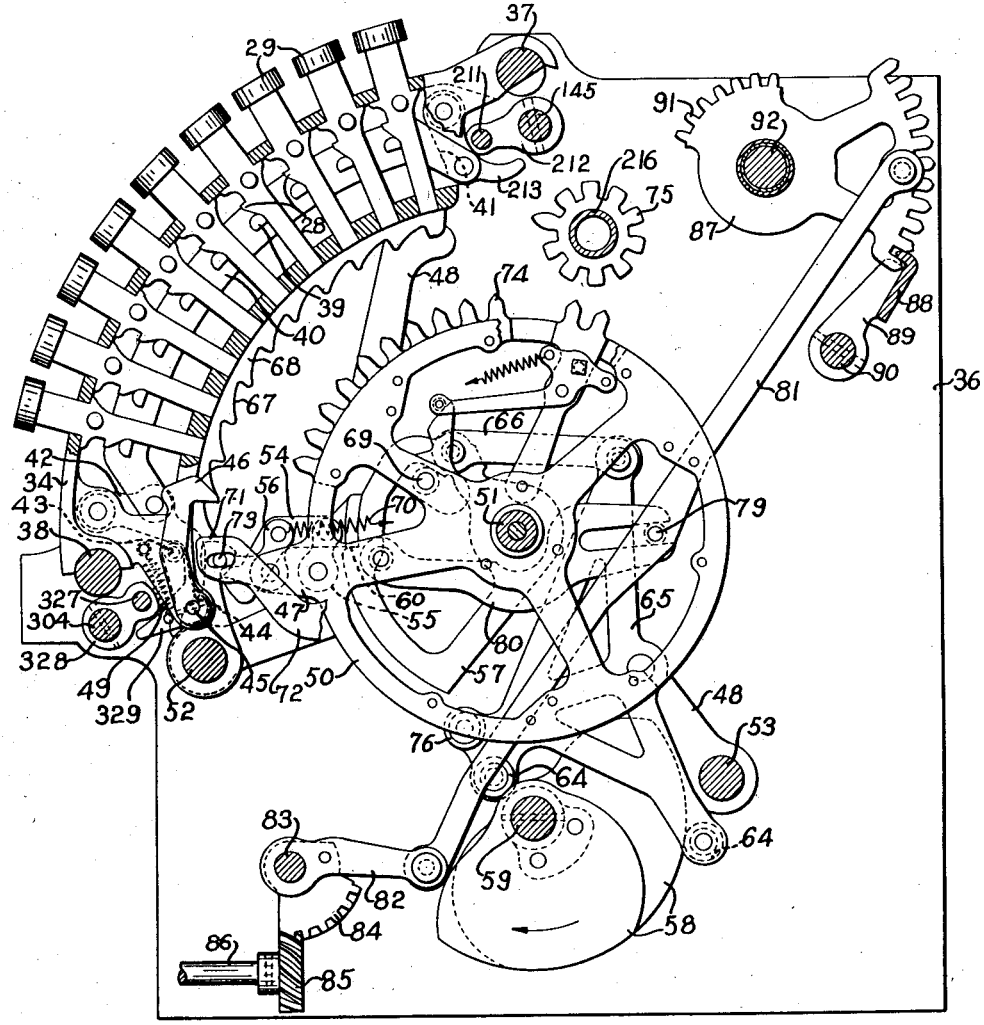
Fig. 1 is a sectional view through a well known registering machine equipped with one embodiment of this invention, taken at the right of one of the banks of amount keys.

At the same time, the fulcrum pin 298 on the floating lever is also moved radially outward, due to its engagement with the slot 375. The effect of these two movements will be to move the floating lever 278 radially away from the stud 283, upon which the total lever 32 is pivoted, and swing the totalizer draft link 258 counter-clockwise to position the stud 259 (Fig. 4) of such draft link within the co-acting hook 260 of the totalizer engaging spider 261, so that when the latter rocks clockwise during the ensuing operation of the machine, the selected totalizer will be engaged with the actuator racks 74 (Fig. 1).

The desired totalizer, which is to be actuated in a totaling operation, is selected in the same manner as heretofore explained, by depression of the appropriate key 30 or 31, and after the total control lever 32 is adjusted from its normal "add" position to the proper totaling position, the operator depresses the motor bar 33 and the machine starts a totaling operation.

The drive members 57 at the beginning of the first cycle of such operation advance the actuators 50 from their normal home positions to their zero positions, at which time the heads 71 of the goose necks 72 carried by the zero resetting spiders 77, contact the zero arresting pawls 46 which have not as yet been disabled. The pawls 46, by arresting the zero resetting spiders 77, arrest the actuators 50 due to the pin and slot connections 73 between the heads 71 and the latch-supporting bell cranks 56 on the actuators, and the latches 54 disconnect from their drive members 57 and engage their locking ribs 68 in the manner heretofore explained.

The drive members complete their advance travel and are then returned to their normal positions, picking up the actuators just prior to the completion of their return, to restore the actuators to their normal home positions one step below the zero position. The total taking and clearing mechanism is so timed as to engage the selected totalizer with the actuators 50 just after the latter have been restored to their home positions at the end of the first cycle of a totaling and clearing operation.

On a sub-totaling operation, the selected totalizer engages the actuators at about the same time as in an adding operation, on the first cycle of such sub-totaling operation, but, since the zero arresting pawls 46 are effective at that time to prevent advance of the actuators, the totalizer wheels are not then rotated. However, the totalizer remains in engagement with the actuators, so that at the beginning of the second cycle of a sub-totaling operation, the actuators, being free to advance, reversely turn the totalizer wheels until the latter arrive in their zero positions, whereupon they arrest farther advance of the actuators.

The drive members 57 then complete their clockwise travel and start to return to their home positions. The totalizer remains in mesh with the actuator racks 74 during the return of the drive members, which, as in adding operations, pick up the several actuators at the points where they were arrested, the actuators on such return, rotating the totalizer wheels to replace therein the amount they removed on their advance.

The totalizers are disengaged from their actuators at about the same time in the second cycle of a sub-total operation as they disengage in adding operations, as heretofore explained.

In order to arrest the rotation of the totalizer wheels 75, and consequently, the advance of the actuators 50 as the several totalizer wheels arrive at their zero positions, a plurality of partial or mutilated pinions 330 (Fig. 7) are fast on the zero resetting shaft 149, one such pinion being associated with each of the denominational amount actuators 50.

One end of a segment lever 331 meshes with each pinion 330, each segment lever being pivoted at 332 on a hanger, (not shown), which is similar to the hanger 51 shown in Fig. 1. At its opposite end, each segment lever 331 is forked to embrace a stud 333 constituting the floating pivot for a pair of toggle links 334, which, together, form a toggle lever. The outer end of one of the toggle links 334 is pivoted to the tail of a trip pawl 335 which is pivoted at 332, and lies in the plane of its totalizer wheel 75 of corresponding denomination. The outer end of the remaining toggle link 334 is pivoted to one arm of a supporting lever 336 pivoted at 341 to the adjacent hanger (not shown), alongside its associated zero resetting spider 77. A locking dog 337 is pivoted to the opposite arm of the supporting lever 336, and is constantly urged in clockwise direction about its pivot by a spring 338. A stop 339 mounted on the lever 336 limits the clockwise movement of the dog 337. The spring 338 also serves to retain the supporting lever 336 in its normal position, as shown in Fig. 7. The dog 337 has a tooth extending laterally into the plane of the corresponding zero resetting spider 77, the tooth on the dog being adapted to co-operate with notches 340 formed on the inner periphery of the corresponding denominational spider 77 journaled on the hub 51, as previously described.

Figure 22:
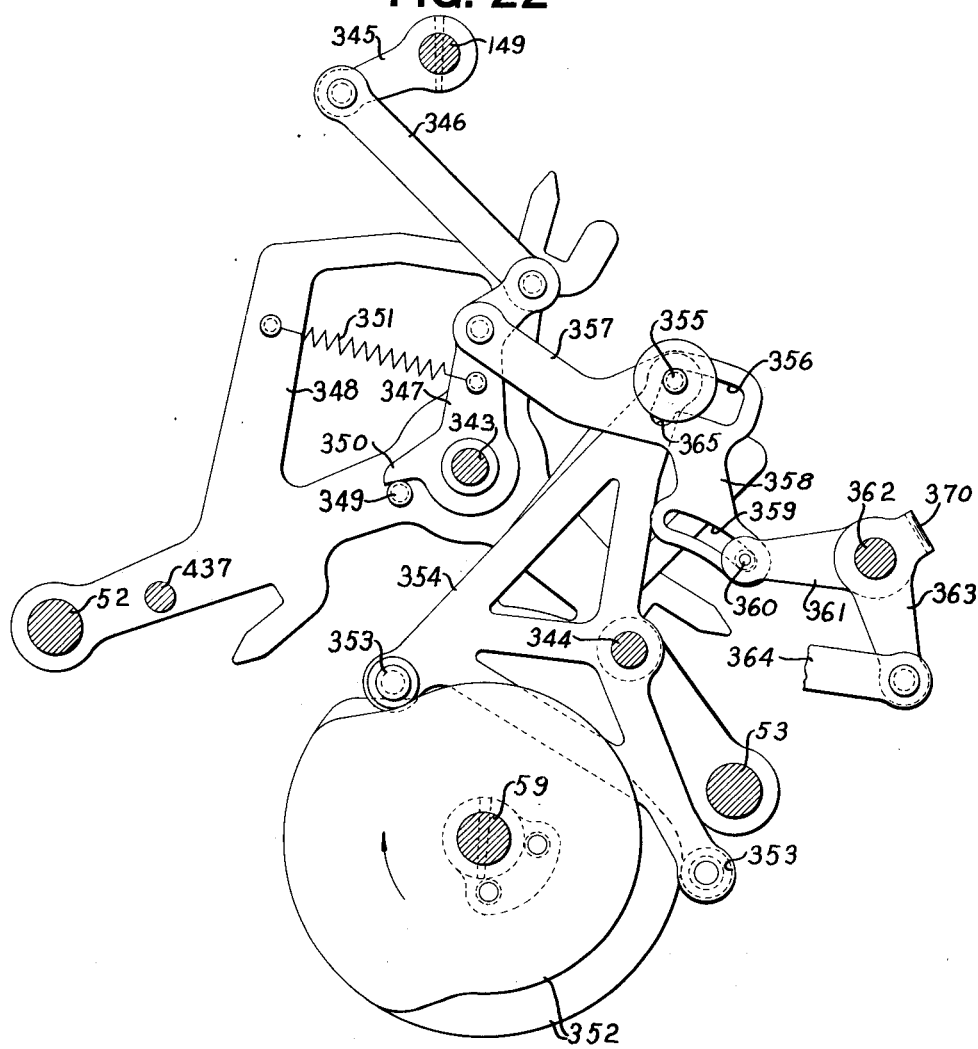
Fig. 22 is a detail view of the linkage for operating the upper reset line shaft.

The reset shaft 149 is rocked counter-clockwise as viewed in Figs. 7 and 22, at the beginning of the second cycle of a total taking operation, and later in the second cycle, it is rocked clockwise to its normal position. Reference to the partial time chart (Fig. 25) is suggested as an aid in understanding the timing of the actuating mechanism for this shaft.

The shaft 149 is the well known reset shaft, common to machines of this type, and a description thereof can be found in any one of the patents cited earlier in this specification.

While the function of the reset shaft 149 is identical with that of the reset shafts illustrated in the above mentioned patent, the manner of giving the shaft its rocking movement in the instant invention differs from that of former machines. A description of this actuator mechanism and the total lever control thereof, follows.

A pair of cams 352 (Fig. 22) fast on the main drive shaft 59 operate upon the spaced projections 353 carried at the forked arm of a transmission lever 354 pivoted at 344 to the hanger 348 supported on the cross rods 52 and 53.

A headed stud 355 on the remaining arm of the lever 354 projects through an opening 356 formed intermediate the ends of a link 357 pivoted at one end to a rocking arm 347 journaled on a stud 343 on the hanger 348 and connected by a link 346 to an arm 345 fast on the reset shaft 149.

A spring 351 attached to the rocking arm 347 normally holds the latter and the reset shaft 149 in, and returns them to their home positions, the arm having a finger 350 adapted to contact a stop 349 on the hanger 348 to arrest the parts in such positions.

The cams 352 impart a complete oscillation to the transmission lever 354 and its stud 355 at each cycle of operation of the machine, the stud idly traversing the opening 356 in the link 357 except upon the second cycle of each total taking operation.

An extension 358 on the link 357 is slotted as at 359 to accommodate a stud 360 projecting from an arm 361 of a bail 370 journaled on a shaft 362 mounted in the side frames 35 and 36 of the machine. A link 364 connects the remaining arm 363 of the bail with one arm of the intermediate lever 301 (Fig. 6) conveniently at the point at which the pitman 300 is attached to the intermediate lever.

It will be recalled that the pitman 300 is given an initial movement to the left by the total control lever 32 (Fig. 10) when manually adjusted from its "add" position preparatory to a total taking operation. It will also be remembered that just before the beginning of the second cycle of operation on a total taking operation, the pitman 300 is automatically given an additional step of movement to the left. The first of these steps of movement of the pitman 300, through the link 364, rocks the bail 370 (Figs. 6 and 22) clockwise about the shaft 362 to raise the link 357 relatively to the stud 355 on the transmission lever 354, whereby to position an offset 365 of the opening 356 in the link, adjacent the stud, and the second step of movement occurring at the end of the first cycle of a totaling operation, fits the offset notch 365 over the stud 355.

As the transmission lever 354 rocks clockwise on the second cycle of a total taking operation, it will shift the link 357 to the right to rock the arm 347 clockwise, and through the link 346 and arm 345, rock the shaft 149 counter-clockwise.

The reset shaft 149, when rocked counter-clockwise (Fig. 7), rocks the segment levers 331 slightly clockwise to shift the toggle joint studs 333 to the left, (in Fig. 7), thereby straightening the toggle links 334. The tensions of the springs 338 operating upon the supporting levers 336 tend to retain them in their normal positions, so that the straightening of the toggles, rocks the several denominational trip pawls 335 counter-clockwise into the path of a high tooth on their corresponding totalizer pinions 75.

Near the end of the first cycle of a total taking operation, the stop pawls 46 are moved to their ineffective positions. The totalizer is engaged with the actuator racks 74 and as the actuators advance at the beginning of the second cycle of operation, they rotate the totalizer wheels 75 in the reverse direction until the high tooth individual to each of the wheels contacts with the end of the corresponding trip pawl 335, whereupon this pawl will be rocked counter-clockwise about its pivot. The toggle 334 being straight at this time, transmits the counter-clockwise movement of the trip pawl 335 to the supporting lever 336 to rock this lever clockwise and engage the pawl 337 carried thereby with notch 340 on the zero reset spider 77 which lies opposite the pawl at this time.

Engagement of the zero resetting pawls 337 with the zero reset spiders 77 locks the latter in the positions to which they have been adjusted by the actuators 50 under control of the totalizer wheels 75, and because of the pin and slot connections 73 between the goose necks 72 of the reset spiders and the latch-supporting bell cranks 56, the latches 54 are arrested in their advance, and are disengaged from the driving segment 57 and engaged with the locking ribs 68 to arrest the various actuators 50 in positions corresponding to the values of the various digits of the amount just previously registered on the selected totalizer. The totalizer is then disengaged from the actuators 50, leaving the totalizer wheels in their zero positions. After the differentially movable actuators 50 have been positioned under control of the totalizer wheels, the beams 80 (Fig. 1) are actuated in the manner heretofore described, to set up the type wheels to print the total amount taken from the totalizers, and to set the indicator mechanism.

If a totalizer wheel is in its zero position when the totalizer is moved into engagement with the actuators, the high tooth of such wheel immediately strikes the trip pawl 335, the lever 331, and straightens the toggle 334, the pawl 335 is held against clockwise movement by its contact with the high tooth, and the toggle operates the supporting lever 336 clockwise to immediately engage the zero pawl 337 with a notch 340 of the zero reset spider 77 to arrest the latter and its actuator in their zero positions.

The mechanism for controlling the timing of the totalizer engaging or disengaging on total taking operations is old in the type of machine to which the present invention is shown applied. Illustration and description thereof may be found in all of the patents heretofore referred to. However, a brief description will be included in this specification in which certain variations of the old structure will be pointed out.

A slotted link 376 (Fig. 4) pivoted at one end on the same stud 271 upon which is mounted the previously described lever 270, carries a stud 377 which projects through a concentric slot 578 terminating in a cam end 382 in the disk-like body of the total control lever 32. A stud 379 on the upper end of a link 380, enters the slot in the link 376, the link 380 being pivoted at its lower end to the arm 313 (Figs. 4 and 10) fast on the disabling shaft 304. The stud 379 also projects normally through the upper end of a cam slot 381 in the lever 270.

The concentric extent of the slot 378 is of sufficient length to have no effect upon the stud 377 and slotted link 376 when the total control lever 32 is shifted from its normal "add" position to the first position below the "add" position, but adjustment of the total control lever 32 to the second or third positions below the "add" position will bring the cam end 382 of the concentric slot 378 to act upon the stud 377 on the slotted link 376, and rock this link counter-clockwise about its pivot 271, and due to the stud 379 and slot connection between the link 376 and lever 270, the lever will also be rocked clockwise about the pivot 271. It will be remembered that the lever 270 carries a guide and supporting stud 266 engaging an elongated slot 267 in the pitman 265. By means of this connection, the pitman 265 will be lowered to disengage the notch 272 thereon from the stud 273 on the disk 261.

As hereinbefore described, the total control lever 32, when shifted to any of its positions out of the "add" position, rocks clockwise the disabling shaft 304, and the arm 313 fast thereon, to lower the stud 379 in the slot in the link 376, and along the straight portion of the slot 381 in the lever 270, but will not, at this time, cause the stud 379 to traverse the cam portion of the slot 381, and therefore, will not affect the lever 270. During the first cycle of a total taking operation, the cams 262 shift the pitman 265 to the right, but as the pitman was disengaged from the stud 273 before the beginning of the operation, it will not rock the totalizer engaging disk 261 to engage the selected totalizer with the actuators. Near the end of the first cycle of operation, the disabling shaft 304 receives its second clockwise step of movement, as described above, to rock the arm 313 clockwise and draw the link 380 and its stud 379 a further step downwardly. As the slotted link 376 is held against movement at this time, due to the engagement of its stud 377 with the slot 378 in the total control lever 32, this second downward step of movement of the stud 379 causes it to traverse the inclined portion of the slot 381 in the lever 270, and rock the lever clockwise. The pitman 265 is now in its right-hand position with a notch 383 thereof lying just above a stud 384 on the totalizer engaging disk 261, so that the second step of movement of the lever 270 fits the notch 383 over the stud 384. After this occurs, the cams 262 rock the transmitting lever 264 to shift the pitman 265 to the left and, due to the engagement of the notch 383 with the stud 384, the pitman 265 at this time rocks the totalizer engaging disk 261 with its hooked arms 260 clockwise to engage the selected totalizer with the actuators 50.

Near the end of the first cycle of operation, the zero stop pawls 46 are moved to their ineffective positions, and as the actuators 50 advance with their drive members 57 on the second cycle of a total taking and clearing operation, the totalizer pinions 75 will be reversely rotated until the high teeth thereof come into contact with the trip pawls 335, (Fig. 7), as above described, whereby the latches 54 will be disengaged from their drive members 57 at positions corresponding to the digits composing the amount which was registered on the totalizer. Shortly after this occurs, the cams 262 act to move the totalizer engaging pitman 265 to the right, and as the pitman is still engaged with the stud 384, the totalizer engaging spider 261 is rocked counter-clockwise to disengage the totalizer, while the totalizer wheels remain in their zero positions.

At this point, the cam disk 324 (Fig. 6) has rotated sufficiently to cause its cam groove 323 to act upon the pitman 300 and shift the later one step to the right (in said figure) to partially restore the disabling shaft 304 with its arms 303 and 313, and its universal rod 327, the latter releasing the zero arresting pawls 46 for effective operation. The arm 313 (Fig. 4) lifts its link 380 to cause the stud 379 to retrace its path of travel in the cam slot 381 and rock the guide lever 270 counter-clockwise to disengage the pitman 265 from the stud 384.

The pitman 300 carries a stud 320 projecting through a slot 321 in the restoring link 192, and it will be remembered that the stud 203 on the restoring arm 198 normally lies in an offset recess communicating with an opening 204 formed in the restoring link, and that at each half-rotation of the drive gear 201, the restoring arm 198 is rocked to draw the restoring link downwardly.

Since, in totaling and sub-totaling operations, such movement of the restoring link would be detrimental at certain times, the above connection with the total control lever 32 is arranged, so that upon the manual setting of the total control lever from its "add" position to any of its remaining positions, the pitman 300 will rock the restoring link 192 clockwise about the stud 191 to disengage the offset recess in the opening 204 from the stud 203 of the restoring arm 198, so that the stud 203 lies within the opening and in line with a shoulder 206 located about midway of the length of the opening.

The additional travel imparted to the pitman 300 by the cam disk 324 and its groove 326 will rock the restoring link 192 still farther in clockwise direction to position the stud 203 on the release arm 198 in line with the deepest part of the opening 204 in the link.

As a result the cam race 200 in the large drive gear 201, when the gear has nearly completed one-half of its rotation, will rock the restoring arm 198, first downwardly in clockwise direction, and then immediately return the arm to its normal position, but rocking movement of the arm 198 at this time is idle, as the extreme depth of the opening 204 affords clearance for the stud 203 which exercises no effect on the restoring link 192. Hence the transaction key 30 or 31 depressed prior to the operation of the machine, is not released.

The cam groove 326 in the cam disk 324 coupled at this time by the coupling bar 323 with the large gear 201, is so formed that a short time prior to the end of the second cycle of operation it will act upon the roll 325 carried by the pitman 300 to shift the latter rearwardly towards its normal idle position. The pitman, when so shifted, rocks the restoring link 192 counter-clockwise partway towards its normal position, to bring the shoulder 206 of the opening 204 into the path of the stud 203 on the release arm 198, and immediately thereafter the cam groove 200 in the large drive gear 201 imparts a quick oscillation to the restoring arm 198 which on its clockwise travel, presses its stud 203 against the shoulder 206 of the restoring link 192. Since the shoulder 206 is some distance below the normal position of the stud 203, the latter does not drive the restoring link 192, its arm 190 and the release shaft 145 to the ends of their paths of travel, but merely rocks the release shaft and its arm 215 (Fig. 2) sufficiently to press the arm against the rearward extension or toe of the upper swinging support 99 for the detent bar 98 co-acting with the bank of transaction keys 30 and 31.

It will be noted that the arm 215 lies closely adjacent the extension of the support 99, so that a comparatively slight travel of the arm 215 is sufficient to shift the support 99 and detent bar 98 to release the depressed transaction key 30 or 31.

The cam groove 200 (Fig. 6) of the drive gear 201 immediately returns the restoring arm 198 to its home position, and the stud 203 by contact with the upper wall of the opening 204 returns the restoring link 192 to its home position, and, through the spring 194, returns the arm 190 and release shaft 145 and release arm 215 to their home positions. Near the end of the operation, the cams 262 shift the pitman 265 to the left to the position it occupies at the start of the operation but disengaged from the stud 273. After the totalizer is disengaged from the actuators 50, the drive members 57 return the actuators in the manner heretofore explained, to their normal positions. After the machine comes to rest in its home position, the total control lever 32 is manually restored to its normal or adding position, which return of the lever, shifts the slot 378 (Fig. 4) relatively to the stud 377 on the slotted link 376, to rock the link counter-clockwise, and the link, operating through the stud 379, rocks the guide lever 270 counter-clockwise to re-engage the notch 272 in the pitman 265 with the stud 273 on the totalizer engaging spider 261. The machine is then in readiness for another operation.

Sub-totaling operation

The movement of the pitman 265 is somewhat different on sub-total taking or "read" operations, than on total taking and clearing (reset) operations, due to the necessity of restoring the amount taken from the totalizer back on the same totalizer.

To prepare the machine for sub-total taking operations, the total control lever 32 (Figs. 4 and 24) is adjusted to any one of its three positions above the "add" position, or, as viewed in Fig. 4, it is manually shifted clockwise.

It can be seen from Fig. 4, that the clockwise movement of the total control lever 32 will not affect the arm 376, as the cam slot 378 is concentric with the pivot 283 of the lever in any sub-totaling position to which the lever may be adjusted. The arm 376 will, therefore, remain in the position shown in Fig. 4 throughout a sub-total taking operation. Hence, the totalizer engaging pitman 265 will not be disconnected from the stud 273 on the totalizer engaging disk 261 by the total lever 32, as described on total taking operations. The pawl disabling shaft 304 is given its initial movement, however, the same as on total taking operations, which positions the stud 379 (Fig. 4) just above the inclined portion of the cam slot 381 in the guide lever 270 (Fig. 4). When the pitman 265 is drawn to the right by the cams 262 at about the middle of the first cycle of a sub-totaling operation, the selected totalizer will be engaged with the actuators 50, but as the zero arresting pawls 46 have not been disabled at this time, the actuators 50 remain in their zero positions and do not turn the totalizer wheels.

Near the end of the first cycle of a sub-totaling operation, the disabling shaft 304 is given its second clockwise step of movement, as described above, which causes the universal rod 327 (Fig. 1) to disable the zero arresting pawls 46, and rocks the arm 313 to draw the link 380 and its stud 379 downwardly, thereby rocking the guide lever 270 clockwise to disengage the totalizer engaging pitman 265 from the stud 273. Immediately thereafter, the cams 262 shift the pitman 265 idly to the left.

At the beginning of the second cycle, the cams 352 (Fig. 22) operate the hereinbefore explained linkage to rock the reset shaft 149, after which the actuators 50 advance in clockwise direction under control of the totalizer wheels 75, which have remained in engagement with the actuators since about the end of the first half of the first cycle of a sub-total operation. The actuators 50 advance until their respective totalizer wheels 75 reach their zero positions, whereupon the long teeth of the totalizer wheels operate the zero resetting trains of levers (Fig. 7) to lock the zero resetting spiders 77 where adjusted, and effect the arrest of the actuators and the disconnection of their latches 54 from their drive members 57, and at about the end of the first half of the second cycle of operation, the beams 80 (Fig. 1) are adjusted to position the types to print the sub-total. The cams 262 (Fig. 4) then move the totalizer engaging pitman 265 to its right-hand position, after which the disabling shaft 304 is partially restored, releasing the zero arresting pawls 46 for operation, and moving the stud 379 upwardly along the cam slot 381 in the guide lever 270 to rock the latter counter-clockwise and re-engage the pitman 265 with the stud 273 on the totalizer engaging spider 261.

At the end of the first half of the second cycle of operation the totalizer is partially disengaged from the actuator rack and again engaged therewith, by mechanism provided for the transfer total operation later described. However, this disengagement and engagement of the totalizer has no function during sub-total operations.

At about the same time, that is, the beginning of the last half of the second cycle, the drive members 57 start towards their home positions and restore the actuators to their normal positions, and as the actuators restore, they turn the totalizer wheels 75 still engaged therewith, to replace on the totalizer the amount which was taken therefrom.

Near the end of the second cycle of operation, the cams 262 shift the pitman 265 to the left to disengage the totalizer wheels from the actuators after the latter have been restored.

An aligner comprising a detent 385 pivoted at 372 on the hanger 275, is provided to hold the totalizer engaging spider 261 either in its normal position as shown, or in its shifted position, when the pitman 265 is disengaged therefrom. The tail of the detent 385 carries a projection 386 entered in a cam slot 387 in the guide lever 270. A tooth 388 on the opposite end of the detent 385 co-operates with either of two notches 389 and 390 formed in the totalizer engaging spider 261. The configuration of the cam slot 387 is such that when the guide lever 270 is given its first clockwise movement to disengage the pitman 265 from the totalizer-engaging spider 261, it will rock the detent 385 counter-clockwise to engage its tooth 388 with the notch 389 or 390. The guide lever 270 will then receive a movement, either clockwise to engage the notch 272 with the stud 273, or counter-clockwise to engage the notch 383 with the stud 384. It can be seen from Fig. 4, that the cam slot 387 is so shaped that movement of the guide lever 270 in either direction from the position just described, will rock the detent 385 clockwise to disengage its tooth 388 from the notch in the totalizer engaging spider 261.

*Transfer total operation*

The foregoing mechanism is, in the main, old and well known in the art, and constitutes a part of this invention only insofar as it combines therewith to form the novel features and attain the desired results.

One of such desired results is the transfer of totals from one totalizer to another without setting the total on the keyboard.

This in itself is broadly old in the prior art, but so far as is known, it is new to transfer a total from one totalizer to another on the same or substantially the same axial line with the first-named totalizer.

And it is also thought to be new to transfer a total from one totalizer to another located in substantially axial alinement with the first-named totalizer during a single continuous, uninterrupted operation of the machine.

Again, it is thought to be new, in a machine having a series of totalizers and a set of actuators common to the several totalizers of a series, with means to select any of the totalizers to co-act with the set of actuators, to arrange to automatically transfer an amount registered on one of the series of totalizers to another totalizer of the same series.

And it is thought to be new to effect this last-named function, during a single continuous uninterrupted operation of the machine.

With these ends in view, the transfer total operation may be conveniently effected in the following manner.

When the total control lever 32 is moved to the first position below its "add" position, and the "cash" or "charge" key 30 is depressed, followed by an operation of the machine, the selected one of the totalizers controlled by these transaction keys will be returned to and left at zero, and furthermore, the amount cleared from such selected totalizer will be transferred onto another totalizer or totalizers, which may serve as storage places for a succession of such totals. To this end, the total control lever 32, when moved to this position, adjusts certain controls, which, when the machine is operated, will automatically cause the amount registered on the cash or charge totalizer, depending upon which key is depressed, to be taken therefrom and added into the grand totalizer or totalizers.

In the present disclosure, only the amounts on the "cash" and "charge" totalizers can be automatically transferred to the grand totalizer. It is to be understood, however, that this is merely for illustrative purposes, and it is not intended to limit the invention to these two totalizers, as, by slight changes in structure and in the interlocks, the amounts registered on the totalizers controlled by any or all of the keys in the transaction bank can be transferred to the grand totalizer.

The present invention relates more particularly to the idea of directly transferring to one totalizer a total amount registered on another totalizer without first setting such total amount on the keyboard.

And while this idea broadly is not new, it is believed that it is carried out in a different manner than heretofore.

A transfer total operation is similar to a sub-total taking operation, the difference being, that after the appropriate totalizer selected under control of the "cash" or "charge" key, has been engaged with the actuators 50, and the actuators advanced, and during the first-half of the second cycle of a total taking operation under the control of the totalizer wheels, to unload the amount registered thereon, onto the actuators, the selected totalizer is automatically partially disengaged from the actuators, leaving the "charge" or "cash" totalizer at zero, and leaving the actuators in positions corresponding to the amount taken from the totalizers. The entire totalizer line is then automatically shifted laterally in the machine (or axially of the shaft 219, Fig. 23) to select the grand totalizer, whereupon the latter is immediately engaged with the actuators which are then restored to their normal positions, adding into the grand totalizer an amount corresponding to the amount taken from the "charge" or "cash" transaction totalizer, depending upon which of the latter was selected at the beginning of the transfer total operation.

A convenient form of mechanism to control the machine for making transfer total operations will now be described.

*Partial disengagement of totalizers*

On transfer total operations, the timing of the engagement and disengagement of the transaction totalizer relatively to the actuators is the same as described for sub-total taking operations, that is, the selected transaction totalizer is engaged with the actuators during the first cycle of operation and held in engagement therewith until near the end of the second cycle of operation. Engagement of the totalizer with the actuators is accomplished, it will be remembered, by drawing downwardly the totalizer engaging link 258 (Figs. 4 and 17) through the totalizer engaging spider 261, to rock counter-clockwise the yoke 252, (Fig. 16) with its arms 251 and 253. The yoke 252 operates through the coil spring or flexible connection 257 to also rock the arm 256 counter-clockwise, and since the arm 256 is fast on the totalizer supporting shaft 219, this shaft and its arms 243 and 244 are likewise rocked counter-clockwise, causing the rolls 245 on the arms 243 and 244 to traverse the cam slots 250 in the cam plates 220 and 221 and cam the shaft 219 toward the center of the machine to engage the selected totalizer with the actuators 50. As the arm 256 rocks counter-clockwise with the shaft 219, it causes a stud 391 (Fig. 17) mounted thereon to traverse a slot 392 formed in the upper end of a link 393 until the stud lies at the upper end of the slot. The lower end of the link 393 is pivoted to one arm of an elbow lever 399 journaled at 374 on a hanger 397 (Fig. 23), a link 398 connects the remaining arm of the elbow lever 399 with one end of a transmitting lever 396 pivoted to the hanger 397 at 373, the opposite end of the transmitting lever being forked to embrace and be actuated by a pair of cams 394 fast on the main drive shaft 59. Rollers 395 on the transmitting lever 396 cooperate with the cams 394.

The cams 394 make one complete clockwise rotation on each cycle of operation of the machine, to rock the transmitting lever 396 first clockwise and then back to normal, and the lever 396, operating through the link 398, rocks the bell crank 399 first clockwise to lower the link 393, and then counter-clockwise to restore it to its normal position. On adding operations and during the first cycle of sub-total taking operations, this movement occurs before the totalizer is engaged with the actuators, and therefore, the link 393 will move idly over the stud 391, which, at that time, is positioned at the lower end of the slot 392. On sub-total taking operations, the totalizer is engaged with the actuators on the first cycle of operation, and maintained in engagement therewith until near the end of the first half of the second cycle of operation, when it is partially disengaged and again engaged by the mechanism above described. The totalizer is then held engaged until the end of the second cycle of operation when it is disengaged by the mechanism shown in Fig. 4.

After the actuator has been engaged with the totalizer wheels, as above described, the rolls 245 on the arms 243 and 244 lie at the right-hand ends of the cam slots 250, as shown in Fig. 20, and when the link 393 is drawn down by the cams 394, the stud 391 on the arm 256 being at this time in engagement with the upper end of the slot 392 in the link 393, the arm 256 will be rocked slightly clockwise, as viewed in Fig. 17. Since the arm 256 is fast on the shaft 219, the shaft, and likewise the arms 243 and 244, will be rocked slightly clockwise, which, due to the engagement of the rolls 245 with the cam slots 250 in the cam plates 220 and 221, will slightly disengage the totalizers from the actuators, the arms 243 and 244 moving to the positions shown in Fig. 21.

The totalizer is engaged on the first cycle of operation by the regular engaging mechanism shown in Fig. 4. After the totalizer is engaged by this mechanism on the first cycle, the pitman 265 is disconnected from the totalizer engaging spider 261, and the aligner 385 is moved to engage its tooth 388 with the notch 390 in the totalizer engaging spider 261, thus locking the engaging means in position to retain the totalizer engaged with its actuators. When, therefore, the totalizer is partially disengaged by the pull of the link 393 on the arm 256, as can be seen from Figs. 20 and 21, the arm 256, in its clockwise movement, will tension the spring 257, the arms 253 and 251 being held stationary by the engagement of the hooked arm 260 (Fig. 4) of the totalizer engaging spider 261 with the stud 259 on the free end of the totalizer engaging link 258. Immediately after the totalizer is partially disengaged, as just described, it is automatically shifted laterally in the machine until the wheels comprising the grand totalizer are in line with the actuators, whereupon the cams 394 on the drive shaft 59 restore the link 393 to the position shown in Fig. 17, the spring 257 rocking the arm 256 and shaft 219 counter-clockwise, to engage the grand totalizer with the actuators. Immediately thereafter, the actuators are restored to their zero positions, and, since the amount formerly registered on the transaction totalizer just previously engaged with the actuators, was loaded onto the actuators under control of the transaction totalizer, the actuators, as they return to their home positions, will turn the grand totalizer wheels to add this same amount thereon.

After the amount has been transferred to the grand totalizer, the pitman 265 (Fig. 4) is re-engaged with the pin 273 of the totalizer engaging spider 261, and shortly thereafter, the cams 262 drive the pitman 265 to the left to rock the totalizer engaging spider counter-clockwise to disengage the grand totalizer from the actuators, as was described in subtotal taking operations.

The mechanism for automatically shifting the totalizer line from the position wherein the transaction totalizer, as the "cash" or "charge" totalizer lies in line with the actuators, to the position wherein the grand totalizer lies in line with the actuators after the transaction totalizer has been partially disengaged from the actuators, will now be described.

The totalizer line shifting mechanism is best shown in Figs. 12–15.

A set of cams 404 fast on the main drive shaft 59 operate against rolls 405 mounted on the forked end of a transmission lever 406 pivoted on a stud 425 projecting from the hanger 407 supported on the cross rods 52 and 53. The cams 404 rock the forked lever 406 first counter-clockwise and then clockwise at each cycle of operation of the machine.

A link 408 connects the opposite end of the forked transmission lever 406 with one arm of a bell crank lever 410 pivoted at 411 between the hangers 407 and 412, the remaining arm of the bell crank 410 carrying a stud 414 projecting into a concentric slot 415 formed in the lower end of a link 401, the upper end of which is connected to an arm 400 journaled on the shaft 92.

Normally, the stud 414 idly traverses the concentric slot 415 and imparts no motion to the link 401 and the arm 400, but upon adjusting the total control lever 32 for a transfer total operation, the link 401 is shifted in clockwise direction to fit an offset 416 of the concentric slot 415 over the stud 414 of the actuating bell crank 410, as follows.

The disk-like body of the total control lever 32 is provided with a cam slot 417 (Fig. 10) into which projects a stud 418 carried by one arm of a lever 419 pivoted at 420, to the hanger 407. The opposite arm of the lever 419 carries a pin 421 projecting through a slot 422 formed in a tappet 423 (Figs. 10 and 13) pivoted to an arm 424, journaled on the cross shaft 362. An extension of the arm 424 is bifurcated to straddle the bail 370 (Figs. 13 and 22) which is rocked clockwise in successive steps, first by the total lever 32, and secondly, by the drive cam 326. As the total control lever 32 (Fig. 10) is manually shifted counter-clockwise to its first position below the "add" position, which is the "cash and charge" transfer total position, the cam portion 426 of the slot 417 contacts the stud 418 on the lever 419 and rocks said lever slightly counter-clockwise, holding it in its rocked position, so long as the total control lever remains in its first position below the "add" position. The lever 419 rocks the tappet 423 slightly clockwise to position its free end 427 opposite a stud 428 (Fig. 13) mounted in an arm 429 pivoted at 420 to the hanger 407. It will be recalled that the disabling shaft 304 is also rocked clockwise by the manual adjustment of the total lever 32 to any of its positions out of its normal or "add" position, which rocks the intermediate lever 301 (Fig. 6) slightly clockwise, and operates through the link 364 to rock the bail 370 (Fig. 13) also clockwise.

Due to the connection of the arm 424 with the bail, this arm will also be rocked clockwise, and the tappet 423 will be slid to the left to a position just to the right of but not contacting with the pin 428 in the arm 429. Near the end of the first cycle of operation, the pitman 300 is automatically given an additional step of movement to the left. This second step of movement is imparted by the pitman through the link 364 to the bail 370 which rocks the arm 424 and slides the tappet 423 farther to the left, during which movement the end 427 of the tappet 423 contacts the pin 428 and rocks the arm 429 counter-clockwise. At its upper end, the arm 429 carries a pin 430 projecting into a second concentric slot 431 formed in the link 401, and as the arm 429 rocks counter-clockwise, it shifts the link 401 to engage the offset 416 of the slot 415 with the pin 414 in the arm of the actuating bell crank 410. Therefore, as the bell crank 410 rocks counter-clockwise and then clockwise on the second cycle of operation, it will lift the link 401 and rock its arm 400, first in counter-clockwise direction, and then restore the arm in clockwise direction.

An extension 402 on the arm 400 cooperates with a stud 403 mounted on the arm 234 fast on the supporting shaft 92, which is differentially adjusted under control of the transaction keys 30 and 31, through the link 133, (Fig. 2), aligning segment 138, yoke 231 and spring 236, (Fig. 12) as described above.

It will be recalled that the movement of the supporting shaft 92 operates through the arm 238 (Fig. 23) and link 239 to adjust the spiral drum cam 224 to slide the totalizer line laterally of the machine when selecting the totalizer corresponding to the transaction key 30 or 31 depressed.

When the "cash" transaction key is depressed and the machine operated, the aligning segment 138 (Fig. 14), and consequently the arm 139, the supporting shaft 92 and the spiral shifting drum 224 are adjusted to the positions shown in Fig. 14 and aligned in this position, as a result of which adjustment, the selected transaction totalizer 75 is brought into line with the actuators 50.

On transfer total taking operations, the transaction totalizer is selected by the same differential means just referred to, and is engaged with the actuators 50 on the first cycle of operation. During the first-half of the second cycle of operation, however, the transaction totalizer is partially disengaged from its actuators 50 by the pull on the link 393 (Figs. 16–21), which rocks the shaft 219 and its cam arms 243 and 244 relatively to the cam slots 250 in the cam plates 220, as heretofore explained.

Such partial disengagement of the transaction totalizer is effected by rocking the entire totalizer supporting frame with its series of totalizers, and is for the purpose of enabling the frame and totalizers to be slid relatively to the actuators 50 without interfering with such totalizers while the latter are held in the various advanced positions assumed under control of the transaction totalizer.

This partial disengagement and axial shift of the totalizers can only occur during the time between the moment at which the actuators would arrive in their "nine" positions, and the time when the drive members 57 on their return towards their home positions, would pick up actuators in the "nine" position, and it will be observed that this operation is effected wholly automatically and in a continuous and uninterrupted manner.

As soon as the partial disengagement occurs, the cams 404 force the link 401 (Fig. 13) upwardly to press the extension 402 of the arm 400 against the stud 403 on the arm 234 fast on the shaft 92, and rock this arm and the shaft counter-clockwise to the position shown in Fig. 15, which corresponds to the zero position, as viewed in Fig. 13. The supporting shaft 92, in turn, rocks the spiral drum cam 224 (Fig. 23) through arm 238 and link 239, to its normal or zero position, and the drum cam slides the totalizer frame to position the grand totalizer in line with the actuators. Immediately after this occurs, the totalizer frame is rocked to engage the grand totalizer with the actuators, and the actuators are then restored to their home positions, adding on the grand totalizer the amount which was on the "cash" or transaction totalizer.

The disengaging link 401 and its arm 400 (Fig. 13) are lowered by the cams 404 and the linkage operated thereby just after the grand totalizer is engaged with the actuators. As the arm 234 and supporting shaft 92 were rocked counter-clockwise by the arm 400 to shift the totalizer frame and bring the grand totalizer opposite the actuators, an additional tension is placed upon the spring 236. However, when the arm 400 is rocked clockwise to normal, the arm 234 is prevented from following, due to the engagement of the lower end of the traveler rod 240 (Fig. 23) with a hole or seat in the spiral drum cam 224 into which the end of the traveler rod is projected when the grand totalizer is engaged with the actuators in the usual manner, such a seat being provided for the rod in the drum cam in each of its adjusted positions. Near the end of the second cycle of operation, the grand totalizer is disengaged from the actuators by the regular engaging and disengaging means shown in Figs. 4 and 5, and as the traveler rod 240 is disengaged from its seat in the spiral drum cam 224 (Fig. 23), the spring 236 will act to rock the arm 234 clockwise until the toe 235 (Fig. 13) contacts with the yoke 231. The segment 138, arm 234, and supporting shaft 92 are then free to be adjusted, as described, to position any desired totalizer relatively to the actuators.

On the second cycle of a transfer total operation, the link 364 (Figs. 6 and 13) is returned to the right by the action of the cam groove 326 on the pitman 300, to rock the arm 363 and the arm 424 counter-clockwise. The arm 363 (Fig. 22), in turn, through the bail 370 of which it forms a part, lowers the arm 361 and the adjustable link 357, which results in disengaging the offset 365 from the stud 355 and thus prevents the cams 352 from rocking the reset shaft 149.

The arm 424 (Fig. 13), rocking with the bail 370, withdraws the tappet 423 to its idle position, as shown. A spring 432, attached to the link 401 serves to return the link 401 and its arm 400 to the position shown in Fig. 13. A stop 433 mounted in an ear on the link 401 contacts an abutment 434 to limit downward movement of the link 401. Only a fragment of the abutment 434 is shown in Fig. 13.

After the machine comes to rest at the end of the transfer total operation, the total control lever 32 is manually returned to its normal or "add" position, causing the walls of the cam slot 417 (Fig. 10) in the disk-like body of the total lever to rock the lever 419 slightly clockwise and restore the tappet 423 to its normal position. The manual restoration of the total lever 32 returns the disabling shaft 304 to its normal position, together with its arms 303 and 313 and the universal rod 327.

This results in the restoration of the link 380 (Fig. 4) and its stud 379 to their normal positions, and the return of the pitman 300 (Fig. 6) to its idle position with its roll 325 withdrawn from the cam race 326 into its seat.

The disconnection of the coupling 323 between the large gear 201 and the cam disk 324 occurred just prior to the end of the second cycle of the total taking operation, as a result of the shape of the cam groove 326.

Coincidently therewith the disabling shaft 304 was rocked the first of its two steps of return.

Interlocks

Means is provided to prevent adjustment of the total control lever 32 after a transaction key 31 has been depressed. A tail 435 (Figs. 2 and 3) on the lever arm 114 fast on the short shaft 109 to which is secured the zero stop pawl 108, normally lies in the path of a nose on an arm 436 fast on a shaft 437 supported in the hanger 51 of the transaction bank, the hanger 275 supporting the totalizer engaging control mechanism and the hangers 397, 348 and 412 supporting the various control mechanisms described above. A locking arm 438 fast on the shaft 437 at a point adjacent the total control lever 32, is adapted to engage any of the notches formed in a plate 439 secured to the lever 32. A spring 440 connected to an extension 441 of the arm 438 normally retains the locking arm 438, shaft 437 and arm 436 in idle position, the locking arm being disengaged from the plate 439, and the nose of the arm 436 pressing against the tail 435 of the lever arm 114.

The plate 439 has five notches cut therein, one for the "add" position of the total control lever, and one each for the first and second positions of such lever below the "add" position, and one each for the first and second positions above the "add" position. It will be recalled that when a key 31 is depressed, the zero stop pawl 108, the shaft 109 and the arm 114 are rocked counter-clockwise. The tail 435, of course, rocks counter-clockwise with its arm 114, and due to its engagement with the nose on the arm 436, the arm 436, the shaft 437, and the locking arm 438 will be rocked clockwise to engage a tooth 442 on the locking arm 438 with one of the notches in the plate 439.

When this occurs, the total control lever 32 is locked against movement in either direction. This interlock also functions to prevent movement of the total control lever 32 when one of the keys 30 is depressed. In this case, however, the lever arm 114 is rocked counter-clockwise by the foot 112 on the control sector 110, which, it will be remembered, is operated by depression of one of the keys 30.

When the total lever 32 (Fig. 24) is adjusted to either the first position above or below the "add" position, it is desired to lock the keys 31 against depression.

The lower swinging arm 105 (Fig. 3) which supports the detent bar 103 at its lower end, has a toe 445 adapted to co-operate with projections on an arresting bar 446 (Fig. 11) slidably mounted upon studs 447 in a frame 448 (Fig. 3).

The total control lever 32, when adjusted, is effective to slide the arresting bar 446 (Fig. 11) laterally of the machine. The arresting bar 446 is notched to provide projections 449 in positions corresponding to the first position above and the first position below the "add" position of the total control lever. It can be seen, therefore, that when the arresting bar 446 is positioned with one of the projections 449 in the path of the toe 445, the arm 105 will be prevented from rocking clockwise and lock the control bar 103 against yielding under the pressure of the keys 31. Hence, the keys 31 will be locked against depression.

To position the arresting bar 446, a link 450 (Fig. 3) connects the total control lever 32 with an arm 451 journaled on the printer shaft 83, previously described. A spiral segment 452 journaled on the printer shaft and connected to the arm 451, meshes with a spiral pinion 453 fast on a shaft 454 supported in the machine by the frame 448 and a bar 456. Beyond the frame 448, the shaft 454 carries a segment gear 455 meshing with the teeth of a rack 457 supported in the machine on a rod 458 and another similar rod, not shown.

This rack is used to position printing elements to print characters indicative of the position to which the total control lever 32 is adjusted. The rack 457 has another series of teeth which mesh with teeth on a gear segment 459 loose on a rod 460. Fast to the gear segment 459 is another gear segment 461, the teeth of which mesh with teeth formed on the lower edge of the arresting bar 446.

Adjustment of the total control lever 32 (Fig. 3) counter-clockwise to its first position below the "add" position, raises the link 450 and rocks the arm 451 and segment 452 counter-clockwise about the shaft 83. The segment 452 rocks the pinion 453 and the shaft 454 counter-clockwise, as viewed in Fig. 11, which, through the rack 457, rocks the segments 459 and 461 clockwise. The segment 461, on its clockwise travel, propels the arresting bar 446 to the right to position the left-hand one of the projections 449 in the path of the toe 445, which prevents clockwise movement of the arm 105, and consequently, locks the transaction keys 31 against depression, as just described.

The movement of the total control lever 32 clockwise to its first position above the "add" position lowers the link 450 and rocks the segment gear 452 clockwise, which reverses the direction of movement of the chain of mechanism just described, and slides the arresting bar 446 to the left to position the right-hand one of the projections 449 in the path of the toe 445, which results, as above described, in locking the transaction keys 31 against depression.

When the total control lever 32 (Fig. 3) is moved to its second position either above or below its "add" position, it is desired to lock the transaction keys 30 against depression. This is accomplished in the following manner.

Referring to Fig. 3, it will be recalled that the slot 189 in the disk-like body of the total control lever, which accommodates the stud 188 on the arm 187, is reduced in width at its opposite ends, and the extended travel of the total control lever in its adjustment to its second position in either direction from its normal "add" position, will locate one or the other of the reduced ends of the slot 189 about the stud 188 to lock the stud 188 and its arm 187 against rocking movement. The arm 187 is fast on the shaft 178, to the opposite end of which is secured the arm 177 carrying the pin 176. It will be recalled that the upper end of the arm 115 is adapted to cooperate with the pin 176 to raise the arm 177 when one of the transaction keys 30 is depressed. However, if the pin 176 is held against movement, the detent sector 110 cannot rock in counter-clockwise direction, due to the engagement of the cam portion of the arm 115 with the pin 176. Therefore, the transaction keys 30 will be locked against depression when the total lever is moved to its second position either above or below the "add" position.

Means is also provided to lock the transaction keys 30 and 31 against depression, when the total control lever 32 is adjusted to its "grand total" positions, i. e., the third position either above or below the "add" position. To this end, blocks 462, which may form the ends of the plate 439, are so located on the disk-like body of the total control lever 32 as to be positioned directly in the path of the tooth 442 of the arm 438 when the total-control lever is adjusted to the third position above or below the "add" position, thereby preventing clockwise movement of this arm which, as above described, will lock the transaction keys 30 and 31 against depression.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed as new is:

1. In a machine of the class described, the combination of a plurality of totalizers on a common axis, actuators therefor and means to control the totalizers and actuators for transferring the total from any one of a plurality of said totalizers to the actuators and from the actuators directly to another totalizer located on the same axis.

2. In a machine of the class described, the combination of a plurality of totalizers arranged in axial alinement; actuators therefor; manipulative means to determine the amounts to be registered on any selected totalizer; a grand totalizer arranged in axial alinement with the first-mentioned totalizers; and means to control the totalizers and actuators to transfer an amount registered on any one of a plurality of the first-mentioned plurality of totalizers to the actuators and from the actuators directly to the grand totalizer.

3. In a machine of the class described, the combination of a group of totalizers in axial alinement; actuators therefor; manipulative means to determine the amounts to be registered on any selected totalizer; and means to control the totalizers and actuators to transfer a total from any one of certain of the totalizers to the actuators and from the actuators directly to a particular totalizer in the same group.

4. In a machine of the class described, the combination of a plurality of totalizers on a common axis; actuators therefor; means to control the totalizers and actuators to transfer the total from a certain totalizer to another totalizer on the same axis directly through the actuators, and manipulative means to select the totalizer from which the total is to be transferred.

5. In a machine of the class described, the combination of a plurality of totalizers on a common axis; means to transfer the total from certain of said totalizers to another totalizer on the same axis; manipulative means to select the totalizer from which the total is to be transferred; and automatic means superseding the selection of the totalizer by the manipulative means to select the totalizer to which the total is to be transferred in one continuous operation.

6. In a machine of the class described, the combination of a group of totalizers on a common axis; actuating means for said totalizers adapted to be moved in one direction to add amounts upon the totalizers, and in another direction to restore the totalizers to zero; means to engage any one of a plurality of said totalizers with the actuating means when said actuating means is moving in one direction; and means to engage another totalizer located on the same axis with the plurality of totalizers, with the actuating means when said actuating means is moving in the other direction.

7. In a machine of the class described, the combination of a group of totalizers on a common axis; actuating means for said totalizers adapted to be moved in one direction to add amounts upon the totalizers, and in another direction to restore the totalizers to zero; means to select a totalizer for operation; means to engage any one of a plurality of said totalizers with the actuating means when said actuating means is moved in the restoring direction; and means to disengage the totalizer from the actuating means after the actuating means is moved in the zero resetting direction, and to select and engage another totalizer with the actuating means before said actuating means is again moved in the adding direction.

8. In a machine of the class described, the combination of a group of totalizers on a common axis; actuating means for said totalizers adapted to be moved in one direction to accumulate upon the totalizers and in another direction to restore said totalizers to zero; means to engage any one of a plurality of said totalizers with the actuating means when said actuating means is moved in the zero resetting direction; means to disengage the totalizer from the actuating means after said actuating means is moved in the zero resetting direction; and automatic means to select and engage another totalizer with the actuating means before said actuating means is moved in the accumulating direction.

9. In a machine of the class described, the combination of a group of totalizers on a common axis; actuating means for said totalizers adapted to be moved in one direction to accumulate upon the totalizers and in another direction to restore the totalizers to zero; means to engage any one of a plurality of said totalizers with the actuating means when the actuating means is moved in the zero resetting direction; means to disengage the totalizer from the actuating means after the actuating means is moved in zero resetting direction and to engage another totalizer with the actuating means before the actuating means is moved in the accumulating direction; means to select a totalizer to be engaged with the actuating means before said actuating means is moved in the zero resetting direction; and means operable upon the selecting means to cause it to select another totalizer on the same axis to be engaged with the actuating means before said actuating means is moved in the accumulating direction.

10. In a machine of the class described, the combination of a group of totalizers on a common axis; actuators for said totalizers adapted to be moved in one direction to accumulate upon the totalizers, and in another direction to restore the totalizers to zero; means to engage any one of a plurality of said totalizers with the actuators when said actuators are moved in the zero resetting direction; means to disengage the totalizer from the actuators after said actuators have been moved in the zero-resetting direction; additional means to engage a totalizer with the actuators before the actuators are moved in the accumulating direction; means to select which one of the totalizers is to be engaged with the actuators before the actuators are moved in the zero resetting direction; and automatic means to select another totalizer on the same axis for engagement with the actuators by said additional engaging means, after the actuators have been moved in the zero resetting direction and before they are moved in the accumulating direction.

11. In a machine of the class described, the combination of a plurality of totalizers on a common axis; actuators for said totalizers; differentially adjustable means for determining which one of the plurality of totalizers is to coact with the actuators; means to automatically disengage the selected totalizer from the actuators after the latter have restored the selected totalizers to zero; means operable upon the selecting means to cause it to select another totalizer on the same axis for coaction with the actuators; and means to engage the last-named totalizer with the actuators prior to their restoration to home position.

12. In a machine of the class described, the combination of a group of totalizers on a common axis; actuators for said totalizers; differentially adjustable means to select any of a plurality of said totalizers to be engaged with the actuators; and additional means to select another totalizer on the same axis while said first-mentioned selecting means is held in a differentially adjusted position.

13. In a machine of the class described, the combination of a group of totalizers on a common axis; actuating means for said totalizers adapted to be moved in one direction to accumulate upon the totalizers, and in another direction to restore the totalizers to zero; means to select any one of a plurality of said totalizers to be engaged with the actuating means when said actuating means is moved in one direction; and other means to disengage the totalizer first selected after the actuators have been moved in one direction, and to select another totalizer on the same axis to be engaged with the actuating means when the latter is moved in the other direction.

14. In a machine of the class described, the combination of a group of totalizers on a common axis; actuating means for said totalizers, adapted to be moved in one direction to accumulate upon the totalizers, and in another direction to restore the totalizers to zero; means to select any one of a plurality of said totalizers to be engaged with the actuating means before said actuating means moves in the zero resetting direction; means to maintain the selecting means in the adjusted position; means to select another totalizer on the same axis while the first-mentioned selecting means is maintained in its adjusted position and before the actuating means is moved in the accumulating direction; and operating means for said second-mentioned selecting means.

15. In a machine of the class described, the combination of a group of totalizers on a common axis; actuating means common to all of said totalizers, adapted to be moved in one direction to accumulate upon the totalizers and in another direction to restore the totalizers to zero; differentially positioned means to select any of a plurality of said totalizers to be engaged with the actuating means before said actuating means moves in zero resetting direction; means to maintain the selecting means in any of its adjusted positions; means to select another totalizer on the same axis while the first-mentioned selecting means is maintained in one of its adjusted positions, and before the actuating means is moved in the accumulating direction; and operating means for said second-mentioned selecting means.

16. In a machine of the class described, capable of transferring a total from any one of a plurality of a group of totalizers on a common axis to another totalizer on the same axis, the combination of a plurality of totalizers on a common axis; selecting means for said totalizers; auxiliary selecting means; controlling means to render said auxiliary selecting means effective; and means to render said controlling means effective.

17. In a machine of the class described, the combination of a plurality of totalizers on a common axis; actuators therefor; a differentially adjustable shaft, the position of which determines which one of the totalizers is to co-act with the actuators; and a plurality of means to adjustably position the shaft to different positions during a continuous operation of the machine.

18. In a machine of the class described, the combination of a plurality of totalizers on a common axis; actuating means therefor; a differentially positioned shaft, the position of which determines which one of said totalizers is to co-act with the actuating means; differentially adjustable means for positioning the shaft to select one of the totalizers; and other means, superseding the differential adjustable means, to position the shaft to select another totalizer on the same axis.

19. In a machine of the class described, the combination of a plurality of totalizers on a common axis; actuating means therefor; a differentially positioned shaft, the position of which determines which one of said totalizers is to co-act with the actuating means; an arm secured to said shaft; a differentially adjustable segment free on said shaft; means to adjust said segment; a spring connecting the segment and the arm to position the arm and shaft to select one of the totalizers; a second arm free on the shaft adjacent the first-mentioned arm; means to operate the second-mentioned arm through a regular excursion to actuate the first-mentioned arm to position the latter and the shaft against the tension of the spring to select another totalizer on the common axis.

20. In a machine of the class described, the combination of a plurality of totalizers on a common axis; actuating means therefor; a differentially positioned shaft, the position of which determines which one of said totalizers is to co-act with the actuating means; an arm secured to said shaft; a differentially adjustable segment free on said shaft, means to variously adjust said segment; means to lock the segment in any of its adjusted positions; a spring connecting said segment and said arm to position said arm and the shaft in accordance with the adjustment of the segment, to select one of the totalizers for operation; a second arm free on the shaft adjacent the first-mentioned arm; means to operate the second-mentioned arm when said second-mentioned arm is operated, to position said first-mentioned arm and the shaft against the tension of the spring to select a certain other totalizer on the common axis when the differentially movable segment is in its adjusted position; and means to determine when the operating means for the second-mentioned arm is effective.

21. In a machine of the class described, the combination of a plurality of totalizers on a common axis; actuators therefor; selecting means for said totalizers; auxiliary means to operate the selecting means to select another totalizer; means to engage the selected totalizer with the actuators; and means to partially disengage the totalizer from the actuators before the auxiliary means functions to select the other totalizer on the common axis.

22. In a machine of the class described, the combination of a plurality of totalizers on a common axis; selecting means therefor; other means operable upon the selecting means; operating means for said other means; controlling means for the operating means; actuating means for the controlling means; and manipulative means to render effective the controlling means and the actuating means for said controlling means.

23. In a machine of the class described, the combination of a plurality of totalizers on a common axis; actuators for said totalizers; a supporting frame for said totalizers, including a shaft adapted to be rocked in one direction to engage the selected totalizer and its actuators, and in the other direction to disengage the totalizer from the actuators; actuating means flexibly connected to the shaft to rock the latter to engage a totalizer with the actuators and to positively rock the shaft to disengage the totalizers from the actuators; and means operable while the selected totalizer is engaged with the actuators, to rock the shaft to disengage said totalizer from said actuators.

24. In a machine of the class described, the combination of a plurality of totalizers on a common axis; actuators therefor; a supporting frame for said totalizers, including a shaft; a yoke member journaled on the shaft; means to rock yoke member; an operative connection between the yoke member and the shaft, flexible in one direction and positive in the other direction, for rocking the shaft to engage a selected totalizer with and disengage it from the actuators; and means to rock the shaft against the tension of the flexible connection to disengage the totalizers from the actuators.

25. In a machine of the class described, the combination of a group of totalizers on a common axis; actuators therefor; means to prepare the machine to take a total or subtotal from any one of a plurality of said totalizers; and means controlled by the preparing means to transfer the total during certain total taking operations to another totalizer on the same axis.

26. In a machine of the class described, the combination with a series of separate totalizers mounted on a common axis; a single set of differentially adjustable actuators common to the series of totalizers; means to select the totalizer with which the actuators shall cooperate to zeroize the selected totalizer; means to engage the selected totalizer with the actuators; of a grand totalizer; additional means to automatically disengage the selected totalizer from the actuators after being zeroized to enable the totalizer selecting means to bring the grand totalizer to effective position relatively to the actuators; and additional means to automatically effect the engagement of the grand totalizer and the actuators to enter the amount taken from the zeroized totalizer into the grand totalizer.

27. In a machine of the class described, the combination with a plurality of totalizers; actuators therefor; and means to engage a totalizer with the actuators to reset the totalizer to zero; of other means to disengage the totalizer relatively to the actuators after the actuators have reset the totalizer to zero; means to automatically shift the cleared totalizer away from the actuators and to position another totalizer in cooperative relation with the actuators; and means to engage the last-positioned totalizer with the actuators to enter therein the amount taken from the first engaged totalizer.

28. In a machine of the class described, the combination with a group of totalizers; and actuators therefor; of flexible means to select one or another of the totalizers to coact with the actuators to accumulate amounts thereon, and to turn the totalizers to zero; means to lock the flexible selecting means where adjusted; a grand totalizer; manipulative means to condition the machine to transfer an amount from any one of a plurality of the first-named totalizers to the grand totalizer; and normally idle actuating means controlled by the manipulative means to operate the flexible selecting means while it is still locked against adjustment, to effect the selection of the grand totalizer and its substitution for the totalizer last positioned to coact with the actuators, and to maintain the grand totalizer in effective position during the operation of transferring the amount from the previously operative totalizer, to the grand totalizer.

29. In a machine of the class described, the combination of a plurality of totalizers on a common axis; selecting means for said totalizer; means to operate the selecting means to select a totalizer for operation; other means, superseding the operating means, to operate the selecting means to select another totalizer for operation; drive means for said other means; controlling means for the drive means to determine the effectivity of the drive means; actuating means for the controlling means; and a manipulative means to determine the effectivity of the controlling means, and to determine the effectivity of the actuating means for the controlling means.

30. In a machine of the class described, the combination of a plurality of totalizers, and means for transferring the amount on one totalizer to another, the means including a single set of actuators the same portions of which are alone used for all actuations of the totalizer wheels used in the operation.

31. In a machine of the class described, the combination of a plurality of totalizers, and means for transferring the amount on one totalizer to another, the means including a single set of actuators each having a single set of teeth, the amounts being both withdrawn from and deposited on the totalizers by these actuators.

32. In a machine of the class described, the combination of a plurality of totalizers on a common axis, and mechanical means for transferring the amount on one totalizer to another during a continuous operation of the machine.

33. In a machine of the class described, the combination of a plurality of totalizers on a common axis, and means for transferring the amount on one totalizer to another, the means including a single set of actuators, a single portion of each being used as the sole means of rotating the totalizer wheels.

In testimony whereof I affix my signature.

SAMUEL BRAND.